US012574899B2

(12) United States Patent
Zhang et al.

(10) Patent No.: US 12,574,899 B2
(45) Date of Patent: Mar. 10, 2026

(54) METHODS TO SUPPORT SIDELINK RETRANSMISSION

(71) Applicant: Telefonaktiebolaget LM Ericsson (publ), Stockholm (SE)

(72) Inventors: Congchi Zhang, Shanghai (CN); Ricardo Blasco Serrano, Espoo (FI); Antonino Orsino, Kirkkonummi (FI); Shehzad Ali Ashraf, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 722 days.

(21) Appl. No.: 17/628,348

(22) PCT Filed: Aug. 13, 2020

(86) PCT No.: PCT/EP2020/072746
§ 371 (c)(1),
(2) Date: Jan. 19, 2022

(87) PCT Pub. No.: WO2021/028531
PCT Pub. Date: Feb. 18, 2021

(65) Prior Publication Data
US 2022/0264533 A1 Aug. 18, 2022

Related U.S. Application Data

(60) Provisional application No. 62/887,032, filed on Aug. 15, 2019.

(51) Int. Cl.
*H04W 72/40* (2023.01)
*H04L 1/08* (2006.01)
(Continued)

(52) U.S. Cl.
CPC ............... *H04W 72/02* (2013.01); *H04L 1/08* (2013.01); *H04L 1/1812* (2013.01);
(Continued)

(58) Field of Classification Search
CPC . H04W 72/02; H04W 72/0446; H04W 72/23; H04W 72/40; H04L 5/0053; H04L 5/0055
See application file for complete search history.

(56) References Cited

U.S. PATENT DOCUMENTS

| | | | | |
|---|---|---|---|---|
| 2016/0095133 A1* | 3/2016 | Hwang | ................. | H04L 1/1887 370/329 |
| 2017/0215183 A1* | 7/2017 | Gulati | ................... | H04L 1/1896 |

(Continued)

FOREIGN PATENT DOCUMENTS

| | | |
|---|---|---|
| CN | 108886498 A | 11/2018 |
| CN | 109565853 A | 4/2019 |
| CN | 109691146 A | 4/2019 |

OTHER PUBLICATIONS

3GPP TSG RAN WG1#97, R1-1906949 Title:On Sidelink CSI Procedure (Year: 2019).*

(Continued)

*Primary Examiner* — Faruk Hamza
*Assistant Examiner* — Abusayeed M Haque
(74) *Attorney, Agent, or Firm* — Murphy, Bilak & Homiller, PLLC

(57) ABSTRACT

Embodiments include methods, performed by a network node in a wireless network, for providing resources for device-to-device wireless communication between a first user equipment (UE) and a second UE. Such methods include transmitting, to the first UE, a configuration that identifies one or more sidelink (SL) channels between the first UE and the second UE, and one or more first hybrid ARQ (HARQ) feedback modes associated with the respective one or more SL channels. Such method also include transmitting, to the first UE, resource information identifying resources usable for communicating via the one or more SL channels Other embodiments include complementary methods by a first UE that include transmitting, to the
(Continued)

second UE, buffered data for a particular SL channel using resources that are compatible with a first HARQ mode associated with the particular SL channel. Other embodiments include network nodes and UEs configured to perform such methods.

20 Claims, 13 Drawing Sheets

(51) Int. Cl.
| | |
|---|---|
| *H04L 1/1812* | (2023.01) |
| *H04L 5/00* | (2006.01) |
| *H04W 72/02* | (2009.01) |
| *H04W 72/0446* | (2023.01) |
| *H04W 72/23* | (2023.01) |

(52) U.S. Cl.
CPC ....... *H04L 5/0053* (2013.01); *H04W 72/0446* (2013.01); *H04W 72/23* (2023.01)

(56) References Cited

U.S. PATENT DOCUMENTS

| | | | | |
|---|---|---|---|---|
| 2017/0347394 | A1* | 11/2017 | Yasukawa ............. | H04L 1/1896 |
| 2018/0213379 | A1* | 7/2018 | Xiong ..................... | H04W 4/70 |
| 2019/0132104 | A1 | 5/2019 | Lee et al. | |
| 2019/0254091 | A1 | 8/2019 | Kim et al. | |
| 2020/0029318 | A1* | 1/2020 | Guo ...................... | H04W 76/11 |
| 2020/0296749 | A1 | 9/2020 | Freda et al. | |
| 2022/0030598 | A1 | 1/2022 | Li | |
| 2022/0131908 | A1* | 4/2022 | Oyman ................. | H04L 65/752 |

OTHER PUBLICATIONS

3GPP TSG RAN WG1#98, R1-1909879 Title: Reply LS on sidelink HARQ Feedback for Groupcast (Year: 2019).*
"Clarification of sidelink BSR for PC5 CA", 3GPP TSG-RAN2#102, R2-1806749, Busan, Republic of Korea, May 21-25, 2018, pp. 1-3.
"3GPP TR 23.725 V16.2.0", 3rd Generation Partnership Project; Technical Specification Group Services and System Aspects; Study on enhancement of Ultra-Reliable Low-Latency Communication (URLLC) support in the 5G Core network (5GC) (Release 16), Jun. 2019, pp. 1-93.
"3GPP TS 23.285 V16.0.0", 3rd Generation Partnership Project; Technical Specification Group Services and System Aspects; Architecture enhancements for V2X services (Release 16), Mar. 2019, pp. 1-37.
"3GPP TS 26.348 V16.2.0", 3rd Generation Partnership Project; Technical Specification Group Services and System Aspects; Northbound Application Programming Interface (API) for Multimedia Broadcast/Multicast Service (MBMS) at the xMB reference point (Release 16), Jun. 2019, pp. 1-46.
"3GPP TS 38.211 V15.6.0", 3rd Generation Partnership Project; Technical Specification Group Radio Access Network; NR; Physical channels and modulation (Release 15), Jun. 2019, pp. 1-97.
"3GPP TS 38.214 V15.0.0", 3rd Generation Partnership Project; Technical Specification Group Radio Access Network; NR; Physical layer procedures for data (Release 15), Dec. 2017, pp. 1-71.
"On support of HARQ procedure over sidelink", 3GPP TSG-RAN WG2 #107; TDoc R2-1910296; Prague, Czech, Aug. 26-30, 2019, pp. 1-6.
"PHY layer procedures for NR sidelink", 3GPP TSG-RAN WG1 Meeting #98; R1-1908917; Prague, CZ, Aug. 26-30, 2019, pp. 1-11.
"Physical layer procedure for NR-V2X sidelink", 3GPP TSG RAN WG1 #97; R1-1906475; Reno, USA, May 13-17, 2019, pp. 1-12.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.
"Sidelink physical layer procedures for NR V2X", 3GPP TSG RAN WG1 Meeting #97, R1-1906008, Reno, USA, May 13-17, 2019, pp. 1-23.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

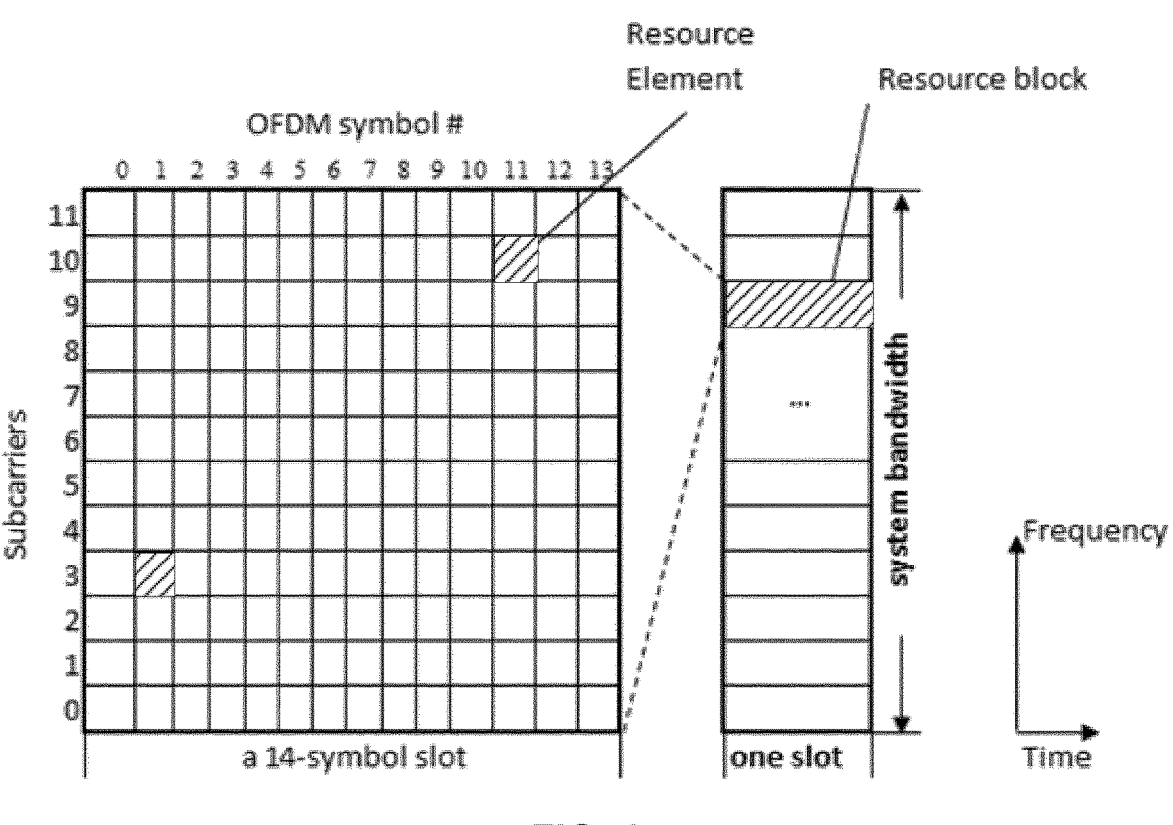
*FIG. 6*
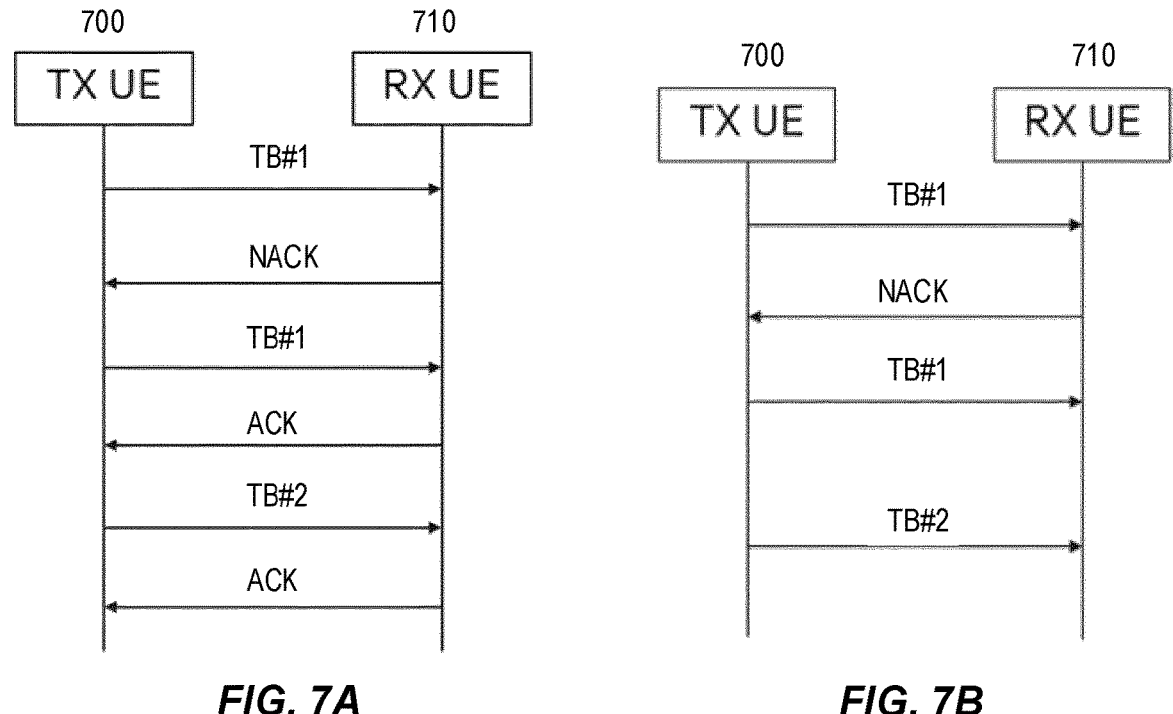
*FIG. 7A*                    *FIG. 7B*

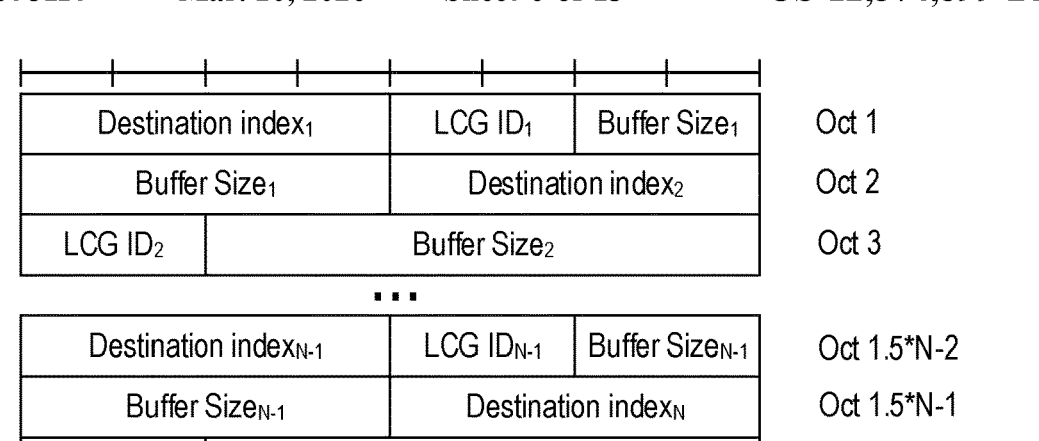

| | | | |
|---|---|---|---|
| Destination index$_1$ | | LCG ID$_1$ | Buffer Size$_1$ | Oct 1 |
| Buffer Size$_1$ | | Destination index$_2$ | | Oct 2 |
| LCG ID$_2$ | Buffer Size$_2$ | | | Oct 3 |

. . .

| | | | |
|---|---|---|---|
| Destination index$_{N-1}$ | | LCG ID$_{N-1}$ | Buffer Size$_{N-1}$ | Oct 1.5*N-2 |
| Buffer Size$_{N-1}$ | | Destination index$_N$ | | Oct 1.5*N-1 |
| LCG ID$_N$ | Buffer Size$_N$ | | | Oct 1.5*N |

*FIG. 8*

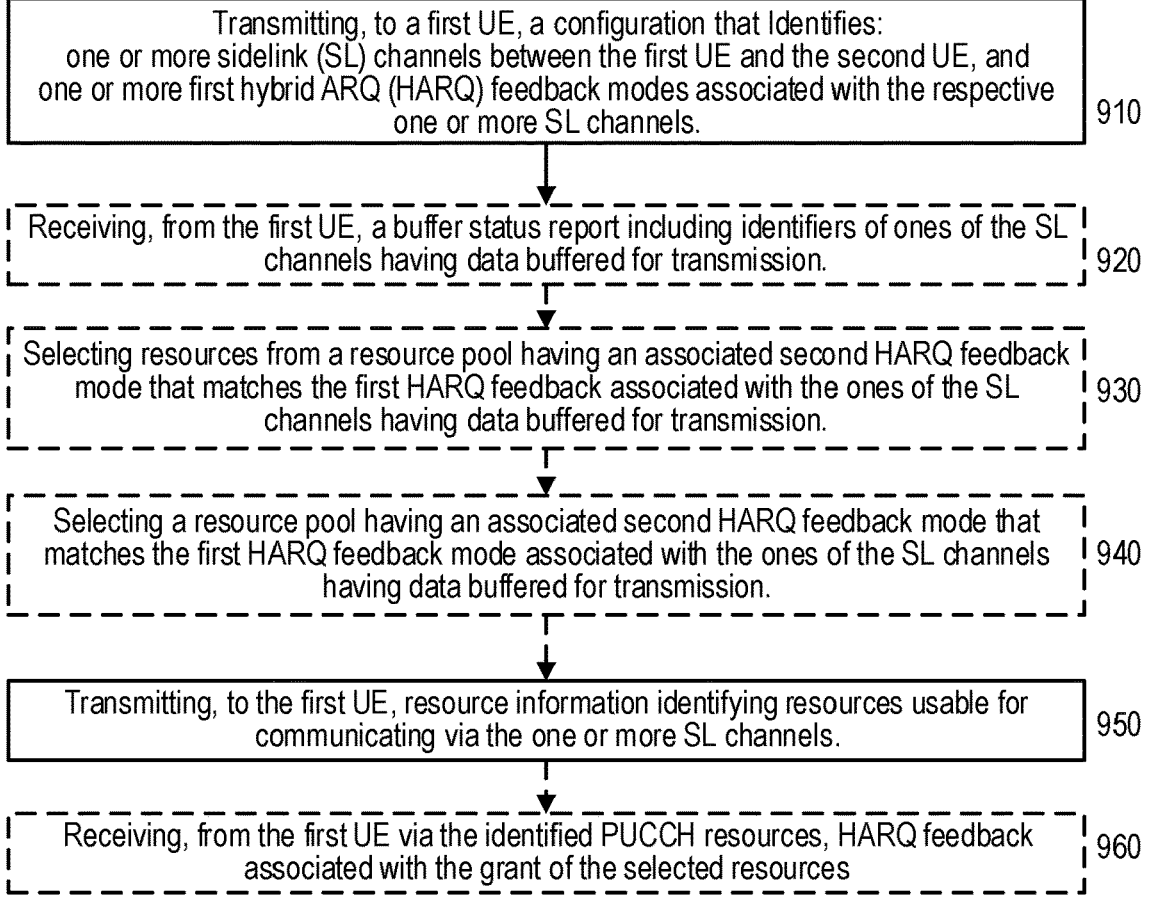

Transmitting, to a first UE, a configuration that Identifies:
one or more sidelink (SL) channels between the first UE and the second UE, and
one or more first hybrid ARQ (HARQ) feedback modes associated with the respective
one or more SL channels.  910

Receiving, from the first UE, a buffer status report including identifiers of ones of the SL
channels having data buffered for transmission.  920

Selecting resources from a resource pool having an associated second HARQ feedback
mode that matches the first HARQ feedback associated with the ones of the SL
channels having data buffered for transmission.  930

Selecting a resource pool having an associated second HARQ feedback mode that
matches the first HARQ feedback mode associated with the ones of the SL channels
having data buffered for transmission.  940

Transmitting, to the first UE, resource information identifying resources usable for
communicating via the one or more SL channels.  950

Receiving, from the first UE via the identified PUCCH resources, HARQ feedback
associated with the grant of the selected resources  960

*FIG. 9*

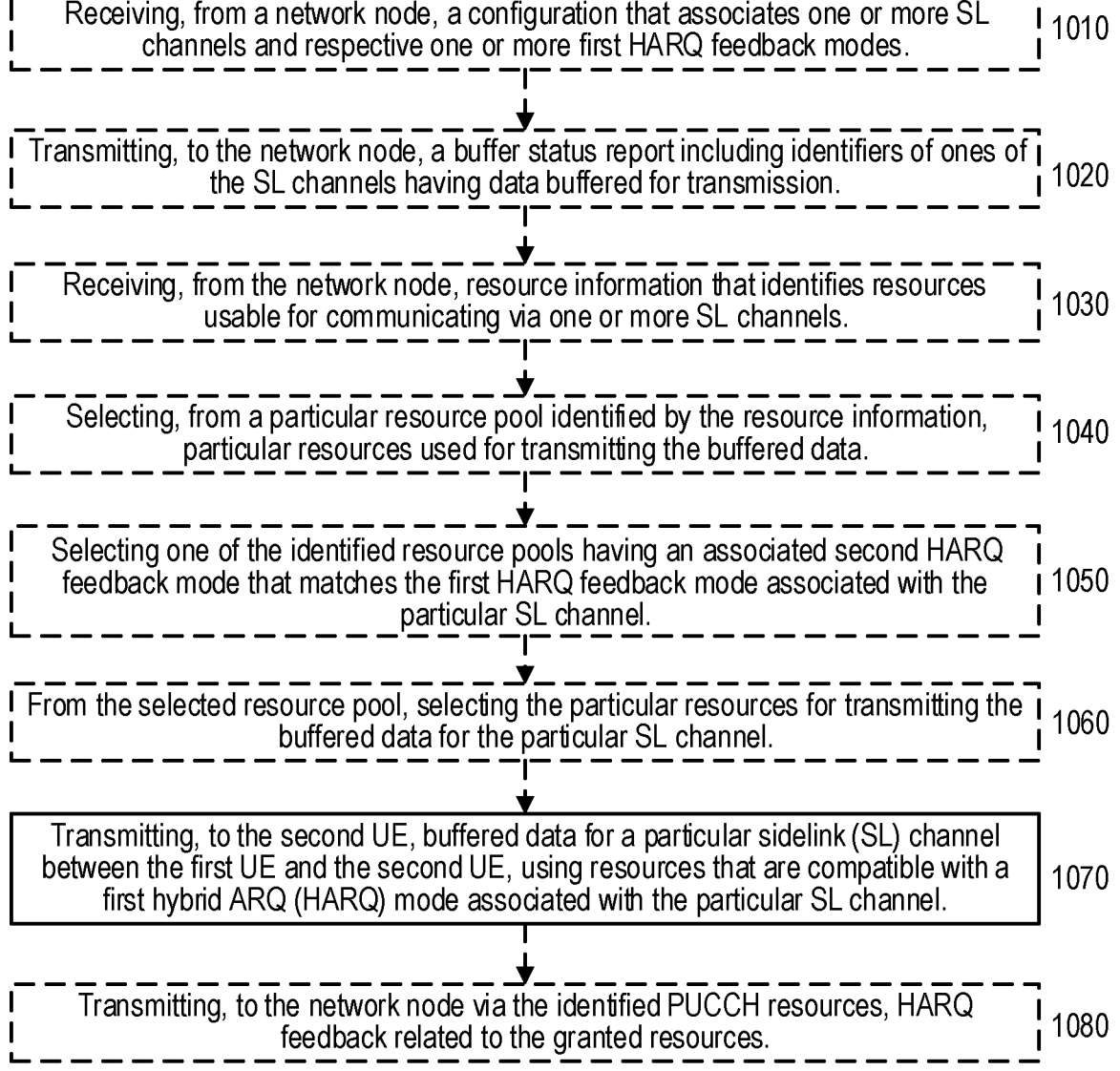

Receiving, from a network node, a configuration that associates one or more SL channels and respective one or more first HARQ feedback modes.     1010

Transmitting, to the network node, a buffer status report including identifiers of ones of the SL channels having data buffered for transmission.     1020

Receiving, from the network node, resource information that identifies resources usable for communicating via one or more SL channels.     1030

Selecting, from a particular resource pool identified by the resource information, particular resources used for transmitting the buffered data.     1040

Selecting one of the identified resource pools having an associated second HARQ feedback mode that matches the first HARQ feedback mode associated with the particular SL channel.     1050

From the selected resource pool, selecting the particular resources for transmitting the buffered data for the particular SL channel.     1060

Transmitting, to the second UE, buffered data for a particular sidelink (SL) channel between the first UE and the second UE, using resources that are compatible with a first hybrid ARQ (HARQ) mode associated with the particular SL channel.     1070

Transmitting, to the network node via the identified PUCCH resources, HARQ feedback related to the granted resources.     1080

FIG. 10

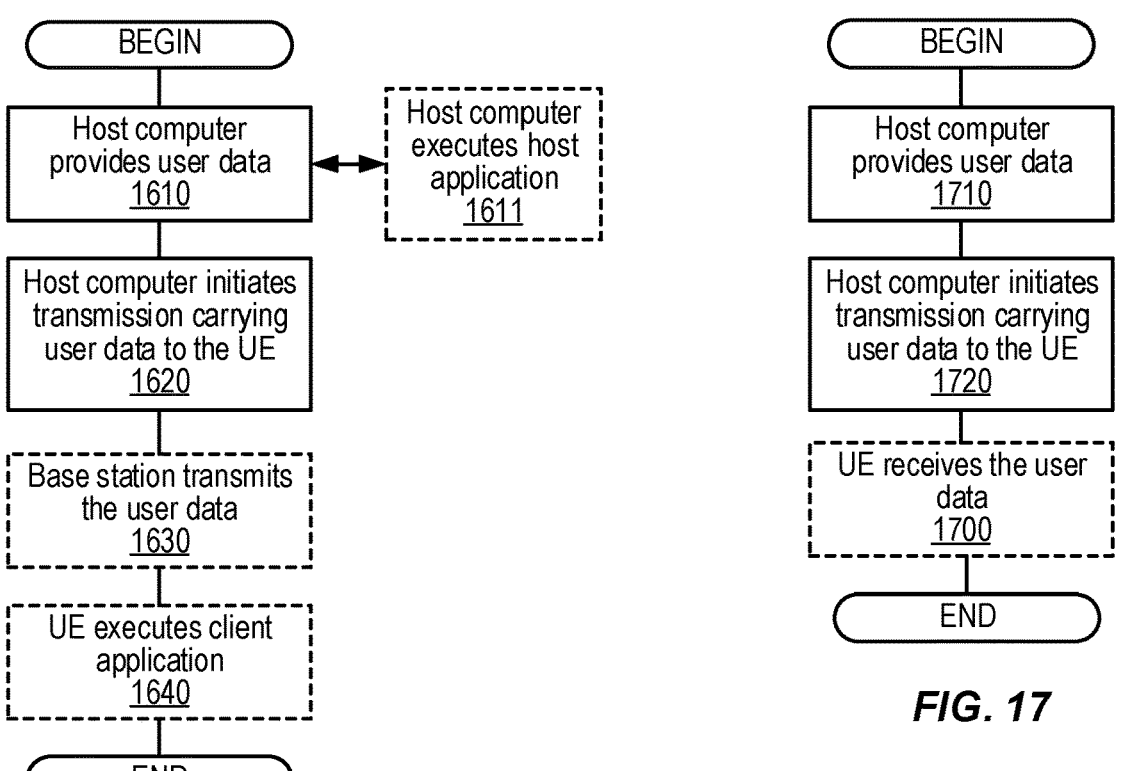
FIG. 16
FIG. 17
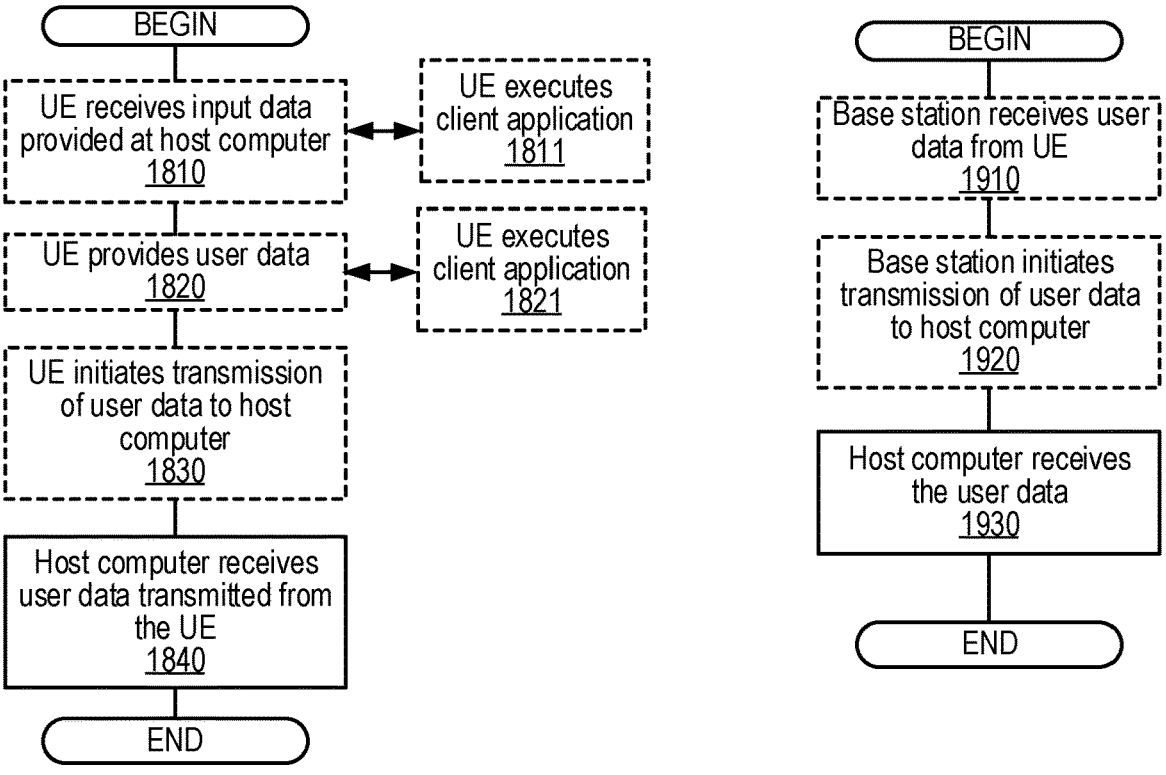
FIG. 18
FIG. 19

METHODS TO SUPPORT SIDELINK RETRANSMISSION

TECHNICAL FIELD

The present application relates generally to the field of wireless communications, and more specifically to discovery and provision of intelligent transportation system (ITS) and/or vehicle-to-everything (V2X) services using device-to-device (D2D) sidelink communication.

INTRODUCTION

Cellular communication systems are currently being developed and improved for Cooperative Intelligent Transportation Systems (C-ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of C-ITS use cases for V2X have been developed, and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard (TS) 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

FIG. 2 shows a more detailed V2X application layer functional model, which further specifies the functional entities. For example, the V2X AS includes a V2X application enabler (VAE) server (as discussed, e.g., in 3GPP Technical Report (TR) 23.275) and a V2X application-specific server. The VAE server provides the V2X application layer support functions to the V2X application specific server over Vs reference point.

Similarly, each of the V2X UEs include a VAE client and a V2X application-specific client. The VAE client provides the V2X application layer support functions to the V2X application specific-client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE server interacts with 3GPP networks (e.g., Evolved Packet Subsystem (EPS) and/or 5G subsystem (5GS)) via the V2, MB2, xMB, Rx, T8, Npcf, and/or N33 reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

A CAM can be used by a vehicle (e.g., emergency vehicle) to broadcast a notification to surrounding vehicles and/or devices of the vehicle's presence and other relevant parameters. CAMs target other vehicles, pedestrians, and infrastructure, and are handled by their applications. CAMs also serve as active assistance to safety driving for normal traffic. The availability of a CAM is checked every 100 ms, yielding a maximum detection latency of 100 ms for most messages. However, the latency requirement for pre-crash sensing warning CAM is 50 ms. On the other hand, DENMs are event-triggered, such as by braking, and the availability of a DENM message is also checked every 100 ms, yielding a maximum detection latency of 100 ms. The package size of CAMs and DENMs varies from 100+ to 800+ bytes and the typical size is around 300 bytes. Each message is supposed to be detected by all vehicles in proximity.

A V2X UE can support unicast communication via the radio interface (also referred to as "Uu") to a 3GPP radio access network (RAN), such as the LTE Evolved-UTRAN (E-UTRAN) or Next-Generation RAN (NG-RAN). A V2X UE can support unicast over the PC5 interface, whereby UEs can communicate with each other directly via "sidelink" rather than indirectly via the 3GPP RAN. V2X sidelink (SL) is a type of device-to-device (D2D) communication.

FIG. 3 shows a high-level view of an exemplary C-ITS environment in which various V2X communications can be employed. At the bottom of FIG. 3, the two left-most users are conventional communication devices (also referred to as "user equipment" or UE, for short) that communicate only via the mobile network(s) shown in the middle layer. In contrast, the right-mode user is only capable of communicating via V2X SL, such as with other nearby users having compatible V2X SL capabilities. However, the middle two users are capable of communicating both via the mobile network(s) in the middle layer, as well as directly with other nearby users having compatible V2X SL capabilities.

Resources for UE V2X SL communication can be configured on a dedicated C-ITS carrier (e.g., in a dedicated ITS band) or on a carrier of the UE's serving cell provided by a 3GPP RAN (e.g., in licensed cellular band). In the latter case, the serving cell's time/frequency resources must be shared by conventional cellular communication (over Uu link) and V2X SL (or D2D) communications. Typically, the SL resources are time multiplexed with serving cell uplink resources used for cellular communication.

In general, a resource pool defines a subset of available subframes and resource blocks for either SL transmission or reception. A D2D UE can be configured with multiple transmit resource pools and multiple receive resource pools, e.g., semi-statically via radio resource control (RRC) signaling. When data is to be sent using a resource pool, the actual transmission resources are selected dynamically from within the pool by either the serving network node (e.g., eNB) or autonomously by the UE itself according to various rules and/or requirements.

The first 3GPP standardization of SL was in Long-Term Evolution (LTE, also referred to as 4G) Release 12 (Rel-12), targeting public safety use cases. Since then, a number of enhancements have been introduced to broaden the use cases that could benefit from D2D technology. For example, the D2D extensions in LTE Rel-14 and Rel-15 include supporting V2X communication, such as described above.

While LTE V2X was primarily directed at traffic safety services, V2X use cases for 5G (also referred to as "New Radio" or "NR") also include applications not entirely safety-related, such as sensor/data sharing between vehicles to enhance knowledge of the surrounding vehicular environment. As such, NR SL is envisioned to support applications such as vehicles platooning, cooperative maneuver between vehicles, remote/autonomous driving, etc.

Consequently, the requirements on data rate, capacity, reliability, latency, range, and vehicle speed are expected to be more stringent for NR SL compared to LTE SL. For example, given the variety of services that can be transmitted over NR SL, a robust QoS framework that accounts for the different performance requirements of various V2X services is needed, as are new radio protocols to support more robust and reliable NR SL communication.

Broadcast, groupcast, and unicast transmissions for V2X SL operation are supported for the in-coverage, out-of-coverage and partial-coverage scenarios. For unicast and groupcast transmissions on SL, hybrid ARQ (HARQ, e.g., ACK/NAK) feedback is also supported. However, there are various problems, issues, and/or difficulties related to HARQ feedback in NR SL operation, particularly for operational modes in which NR D2D/SL transmissions between UEs are scheduled by a wireless network node (e.g., a base station) via resource grants to the respective UEs.

Document US 2016/095133 discloses a method that may repeatedly transmit signals to cope with and reduce transmission errors in (D2D) communication.

SUMMARY

Accordingly, exemplary embodiments of the present disclosure address these and other difficulties relating to HARQ in SL/D2D communications, thereby enabling the otherwise-advantageous deployment of SL/D2D solutions.

Exemplary embodiments include methods (e.g., procedures) providing resources for device-to-device (D2D) wireless communication between a first user equipment (UE) and a second UE. These exemplary methods can be performed by a network node (e.g., base station, eNB, gNB, ng-eNB, en-gNB, etc. or component thereof) in a wireless network (e.g., E-UTRAN, NG-RAN, etc.). These exemplary methods can include transmitting, to the first UE, a configuration that identifies one or more sidelink (SL) channels between the first UE and the second UE, and one or more first hybrid ARQ (HARQ) feedback modes associated with the respective one or more SL channels. These exemplary methods can also include transmitting, to the first UE, resource information identifying resources usable for communicating via the one or more SL channels. In some embodiments, the resource information can identify a plurality of resource pools from which the first UE can select resources for transmitting data associated with the one or more SL channels, and a respective plurality of second HARQ feedback modes associated with the resource pools.

In other embodiments, these exemplary methods can also include receiving, from the first UE, a buffer status report (BSR) including identifiers of ones of the SL channels having data buffered for transmission.

In some of these embodiments, these exemplary methods can also include selecting resources from a resource pool having an associated second HARQ feedback mode that matches the first HARQ feedback mode associated with the ones of the SL channels having data buffered for transmission. In such embodiments, the resource information can include a grant of the selected resources (e.g., for SL transmission by the first UE). Furthermore, the resource information can also identify the second HARQ feedback mode associated with the selected resources.

In some of these embodiments, the resource information also identifies physical uplink control channel (PUCCH) resources for the first UE. In such embodiments, these exemplary methods can also include receiving, from the first UE via the identified PUCCH resources, HARQ feedback associated with the grant of the selected resources.

In other of these embodiments, the configuration can also identify a plurality of resource pools from which the first UE can select resources for transmitting data associated with the one or more SL channels, as well as a plurality of second HARQ feedback modes associated with the respective resource pools. In such embodiments, these exemplary methods can also include selecting a resource pool having an associated second HARQ feedback mode that matches the first HARQ feedback mode associated with the ones of the SL channels having data buffered for transmission. In such embodiments, the resource information can identify the selected resource pool.

In various embodiments, each second HARQ feedback mode associated with selected resources or a selected resource pool can be HARQ enabled or HARQ disabled. In some embodiments, the following applies to each second HARQ feedback mode associated with selected resources or resource pool:

when a second HARQ feedback mode is HARQ enabled, the associated selected resources or resource pool include physical sidelink feedback channel (PSFCH) resources; and when a second HARQ feedback mode is HARQ disabled, the associated selected resources or resource pool exclude PSFCH resources.

Likewise, in various embodiments, each first HARQ feedback mode associated with a respective channel can be HARQ enabled or HARQ disabled. In some of these embodiments, when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

In some embodiments, the resource information can also indicate whether the identified resources (e.g., selected resources, selected resource pool, or plurality of resource pools) can be used for initial transmissions and/or retransmissions.

Other embodiments include methods (e.g., procedures) for device-to-device (D2D) wireless communication by a first user equipment (UE) to a second UE in a wireless network. These exemplary methods can include transmitting, to the second UE, buffered data for a particular sidelink (SL) channel between the first UE and the second UE, using resources that are compatible with a first hybrid ARQ (HARQ) mode associated with the particular SL channel. Other optional operations are described below.

In some embodiments, the particular SL channel and the associated first HARQ feedback mode are part of a configuration, stored at the first UE, that associates one or more SL channels and respective one or more first HARQ feedback modes. In some embodiments, these exemplary methods can also include receiving the configuration from the network node (e.g., before storing the configuration). In such embodiments, these exemplary methods can include receiving, from the network node, resource information that identifies resources usable for communicating via one or more SL channels. These identified resources can include the resources used for transmitting the buffered data.

In some embodiments, these exemplary methods can include transmitting, to the network node, a buffer status report (BSR) including identifiers of ones of the SL channels having data buffered for transmission. In such embodiments, the resource information can be received in response to the BSR.

In some of these embodiments, the resource information can include a grant of the resources used for transmitting the buffered data, as well as a second HARQ feedback mode, associated with the granted resources, that is compatible with the first HARQ feedback mode associated with the particular SL channel.

Furthermore, in some of these cases, the resource information can also identify physical uplink control channel (PUCCH) resources for the first UE. In such embodiments, these exemplary methods can also include transmitting, to the network node via the identified PUCCH resources, HARQ feedback related to the granted resources.

In other of these embodiments, the configuration can also identify a plurality of resource pools from which the first UE can select resources for transmitting data associated with the one or more SL channels, as well as a plurality of second HARQ feedback modes associated with the respective resource pools. In such embodiments, the resource information can identify a particular one of the resource pools having an associated second HARQ feedback mode that matches the first HARQ feedback mode associated with the particular SL channel. Furthermore, these exemplary methods can also include selecting, from the particular resource pool, the particular resources used for transmitting the buffered data. The third example discussed above is an example of such embodiments.

In other embodiments, the resource information can identify a plurality of resource pools from which the first UE can select resources for transmitting data associated with the one or more SL channels, as well as a respective plurality of second HARQ feedback modes associated with the resource pools. In such embodiments, these exemplary methods can also include selecting one of the identified resource pools having an associated second HARQ feedback mode that matches the first HARQ feedback mode associated with the particular SL channel, and from the selected resource pool, selecting the particular resources for transmitting the buffered data for the particular SL channel.

In various embodiments, each second HARQ feedback mode associated with granted resources or an identified resource pool can be HARQ enabled or HARQ disabled. In some embodiments, the following applies to each second HARQ feedback mode associated with granted resources or an identified pool:

when a HARQ feedback mode is HARQ enabled, the associated granted resources or identified resource pool include PSFCH resources; and when a second HARQ feedback mode is HARQ disabled, the associated granted resources or identified resource pool exclude PSFCH resources.

Likewise, in various embodiments, each first HARQ feedback mode associated with a respective channel can be HARQ enabled or HARQ disabled. In some of these embodiments, when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

In some embodiments, the resource information can also indicate whether the identified resources (e.g., granted resources, identified resource pool, or plurality of resource pools) can be used for initial transmissions and/or retransmissions.

Other embodiments include network nodes (e.g., base stations, eNBs, gNBs, ng-eNBs, en-gNBs, etc. or components thereof) or UEs (e.g., wireless devices, V2X UEs, D2D UEs, etc.) configured to perform operations corresponding to any of the exemplary methods described herein. Other embodiments include non-transitory, computer-readable media storing computer-executable instructions that, when executed by processing circuitry of a network node or a UE, configure the same to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 6 shows an exemplary mini-slot arrangement within an NR slot.

FIGS. 7A and 7B show two exemplary HARQ techniques for NR sidelink (SL).

FIG. 8 shows an exemplary SL buffer status report (BSR) medium access control (MAC) control element (CE).

FIG. 9 is a flow diagram illustrating an exemplary method (e.g., procedure) for a network node (e.g., base station, eNB, gNB, ng-eNB, en-gNB, etc. or component thereof) in a wireless network (e.g., E-UTRAN, NG-RAN, etc.), according to various exemplary embodiments of the present disclosure.

FIG. 10 is a flow diagram illustrating an exemplary method (e.g., procedure) for device-to-device (D2D) communication by a first user equipment (UE, e.g., wireless device), according to various exemplary embodiments of the present disclosure.

FIG. 16-19 are flow diagrams illustrating various exemplary methods and/or procedures implemented in a communication system, according to various exemplary embodiments of the present disclosure.

DETAILED DESCRIPTION

Figures 1, 2:
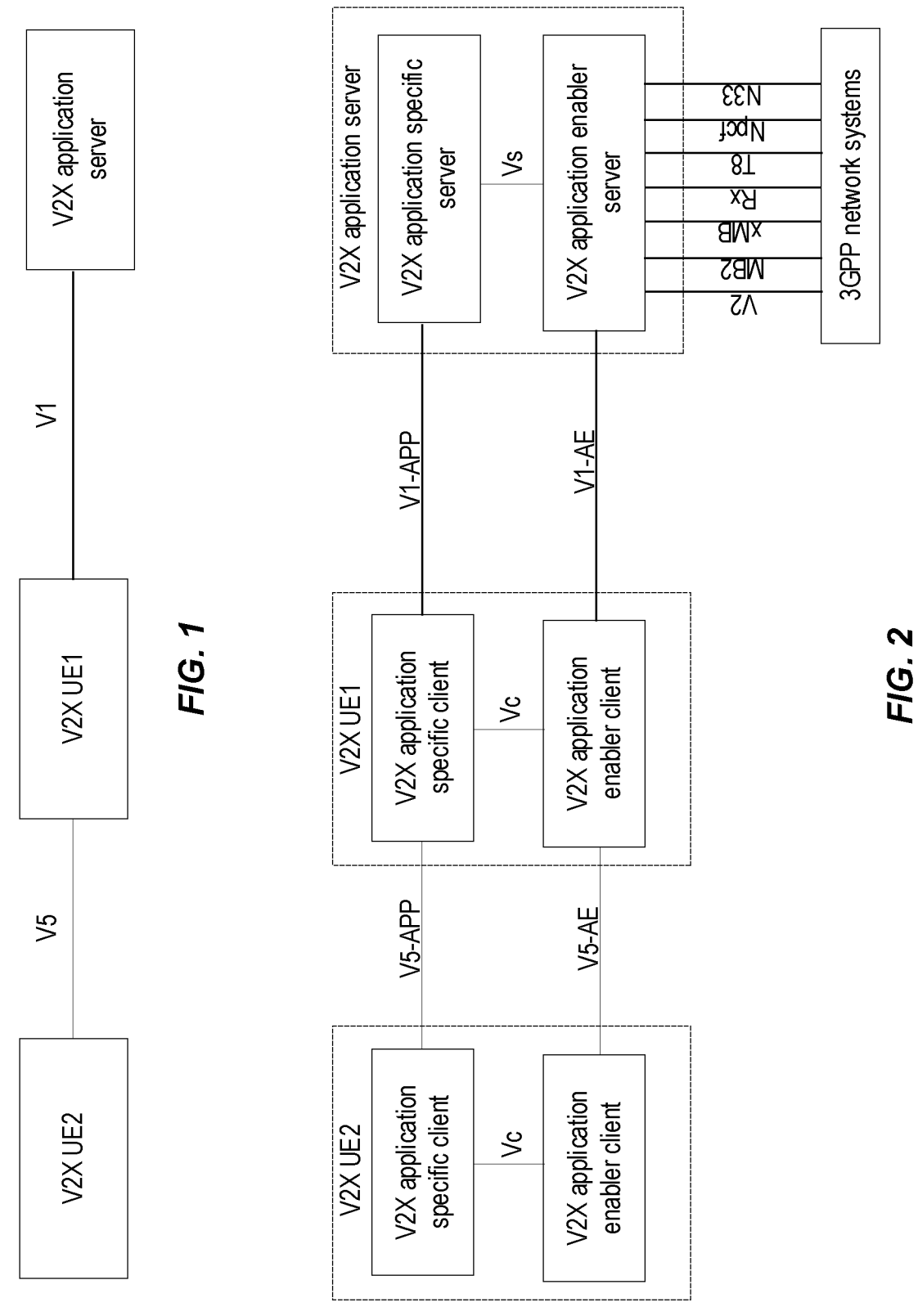
FIG. 1 shows a simplified architectural model for the V2X application layer as specified in 3GPP TS 23.285.
FIG. 2 shows a more detailed V2X application layer functional model.
Figure 3:
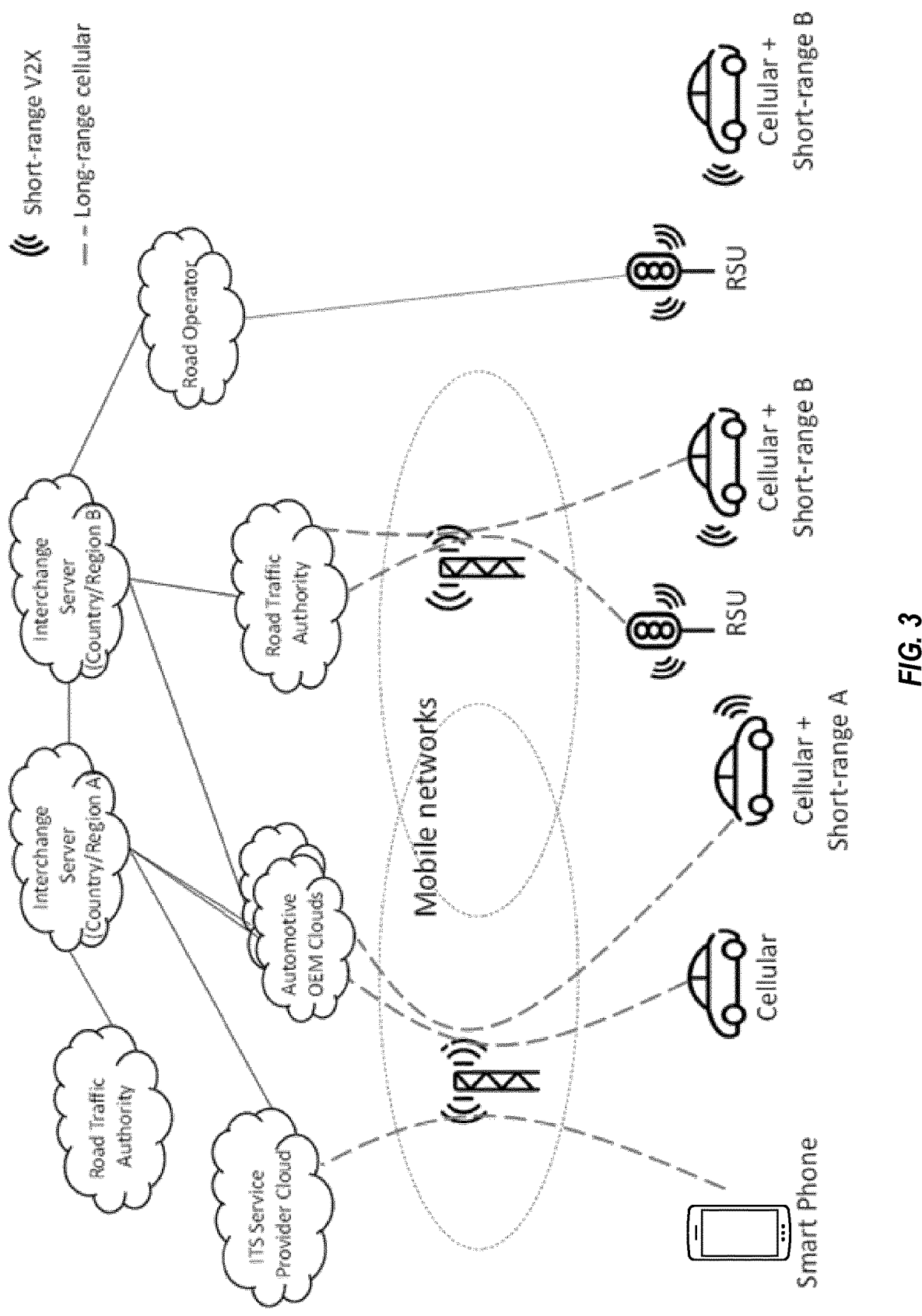
FIG. 3 shows a high-level view of an exemplary C-ITS environment in which various V2X communications can be employed.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a user plane function (UPF), a network exposure function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, D2D UEs, V2X UEs, etc. Unless otherwise noted, the term "wireless device" is used interchangeably herein with the term "user equipment" (or "UE" for short).

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Resource: As used herein, a "resource" can correspond to any type of physical resource or radio resource expressed in terms of time and/or frequency. Examples of time resources include symbol, time slot, subframe, radio frame, TTI, interleaving time, etc. Examples of time-frequency resources include subcarrier, resource block (RB), etc. An RB may also be called as physical RB (PRB), virtual RB (VRB), etc.

Link: As used herein, "link" or "radio link" can correspond to a radio transmission path used for any type of cellular or D2D operation between two endpoints (e.g., network nodes, UEs, wireless devices, etc.). Examples of links used for cellular operation are links on Uu interface, uplink/reverse link (UE transmission to BS), downlink/forward link (BS transmission to UE), etc. Examples of links used for D2D operations are links on PC5, sidelinks, etc.

Channel: As used herein, a "channel" can be a logical, transport or physical channel. A channel may comprise and/or be arranged on one or more carriers and/or a plurality of subcarriers. A channel carrying and/or for carrying control signaling/control information may be considered a control channel (e.g., PDCCH), in particular if it is a physical layer channel and/or if it carries control plane information. Similarly, a channel carrying and/or for carrying data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, there are various problems, issues, and/or drawbacks with respect to HARQ feedback in NR SL operation, particularly with respect to operational modes in which NR D2D/SL transmissions between UEs are scheduled by a wireless network node (e.g., a base station) via resource grants to the respective UEs. This is discussed in more detail below after the following introduction to 5G/NR network architecture and radio interface.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Figure 4:
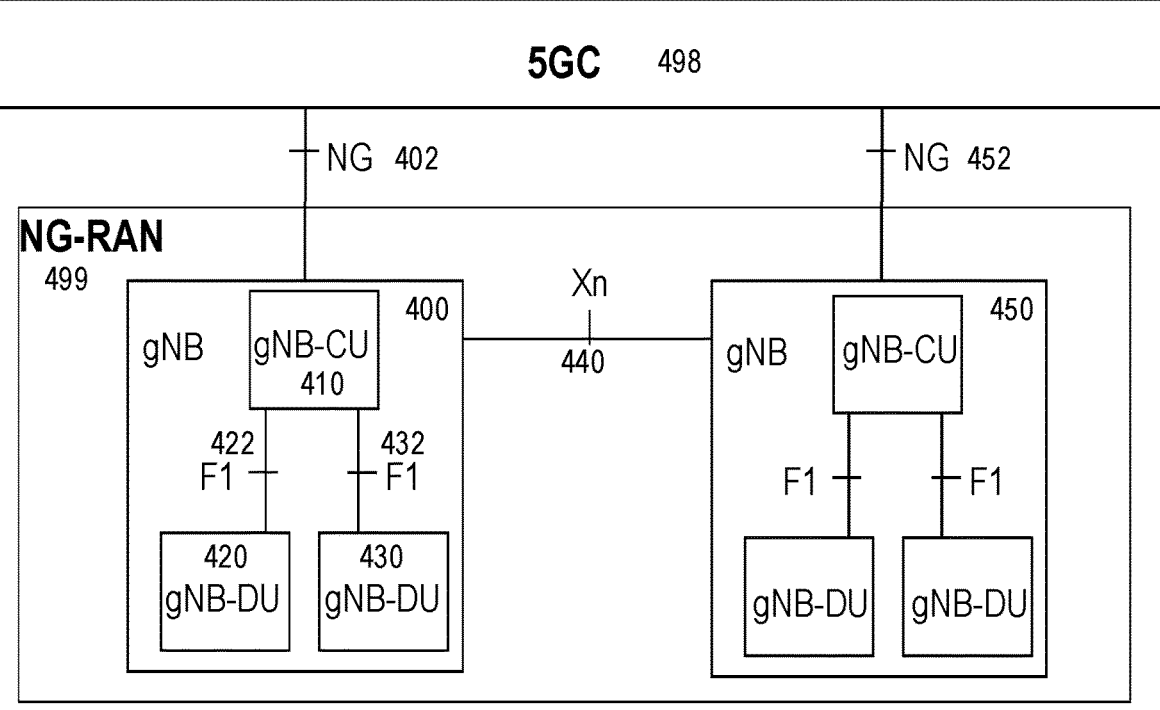
FIG. 4 shows a high-level view of an exemplary 5G network architecture.

FIG. 4 shows a high-level view of an exemplary 5G network architecture, including a Next Generation RAN (NG-RAN) 499 and a 5G Core (5GC) 498. NG-RAN 499 can include one or more gNodeB's (gNBs) connected to the 5GC via one or more NG interfaces, such as gNBs 400, 450 connected via interfaces 402, 452, respectively. More specifically, gNBs 400, 450 can be connected to one or more Access and Mobility Management Functions (AMF) in the 5GC 498 via respective NG-C interfaces. Similarly, gNBs 400, 450 can be connected to one or more User Plane Functions (UPFs) in 5GC 498 via respective NG-U interfaces.

Although not shown, in some deployments 5GC 498 can be replaced by an Evolved Packet Core (EPC), which conventionally has been used together with LTE E-UTRAN. In such deployments, gNBs 400, 450 can connect to one or more Mobility Management Entities (MMEs) in EPC 498 via respective S1-C interfaces. Similarly, gNBs 400, 450 can connect to one or more Serving Gateways (SGWs) in EPC via respective NG-U interfaces.

In addition, the gNBs can be connected to each other via one or more Xn interfaces, such as Xn interface 440 between gNBs 400 and 450. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 4 (and described in 3GPP TS 38.401 and 3GPP TR 38.801) include a Central Unit (CU or gNB-CU) and one or more Distributed Units (DU or gNB-DU). For example, gNB 400 includes gNB-CU 410 and gNB-DUs 420 and 430. CUs (e.g., gNB-CU 410) are logical nodes that host higher-layer protocols and perform various gNB functions such controlling the operation of DUs. A DU (e.g., gNB-DUs 420, 430) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 422 and 432 shown in FIG. 4. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

slots per subframe for $\Delta f$=30 kHz, etc. In addition, the maximum carrier bandwidth is directly related to numerology according to $2^\mu$*50 MHz. Table 1 below summarizes the supported NR numerologies and associated parameters. Different DL and UL numerologies can be configured by the network.

TABLE 1

| $\mu$ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 µs | 66.67 µs | 71.35 µs | 1 ms | 50 MHz |
| 1 | 30 | Normal | 2.34 µs | 33.33 µs | 35.68 µs | 0.5 ms | 100 MHz |
| 2 | 60 | Normal, Extended | 1.17 µs | 16.67 µs | 17.84 µs | 0.25 ms | 200 MHz |
| 3 | 120 | Normal | 0.59 µs | 8.33 µs | 8.92 µs | 125 µs | 400 MHz |
| 4 | 240 | Normal | 0.29 µs | 4.17 µs | 4.46 µs | 62.5 µs | 800 MHz |

Figure 5:
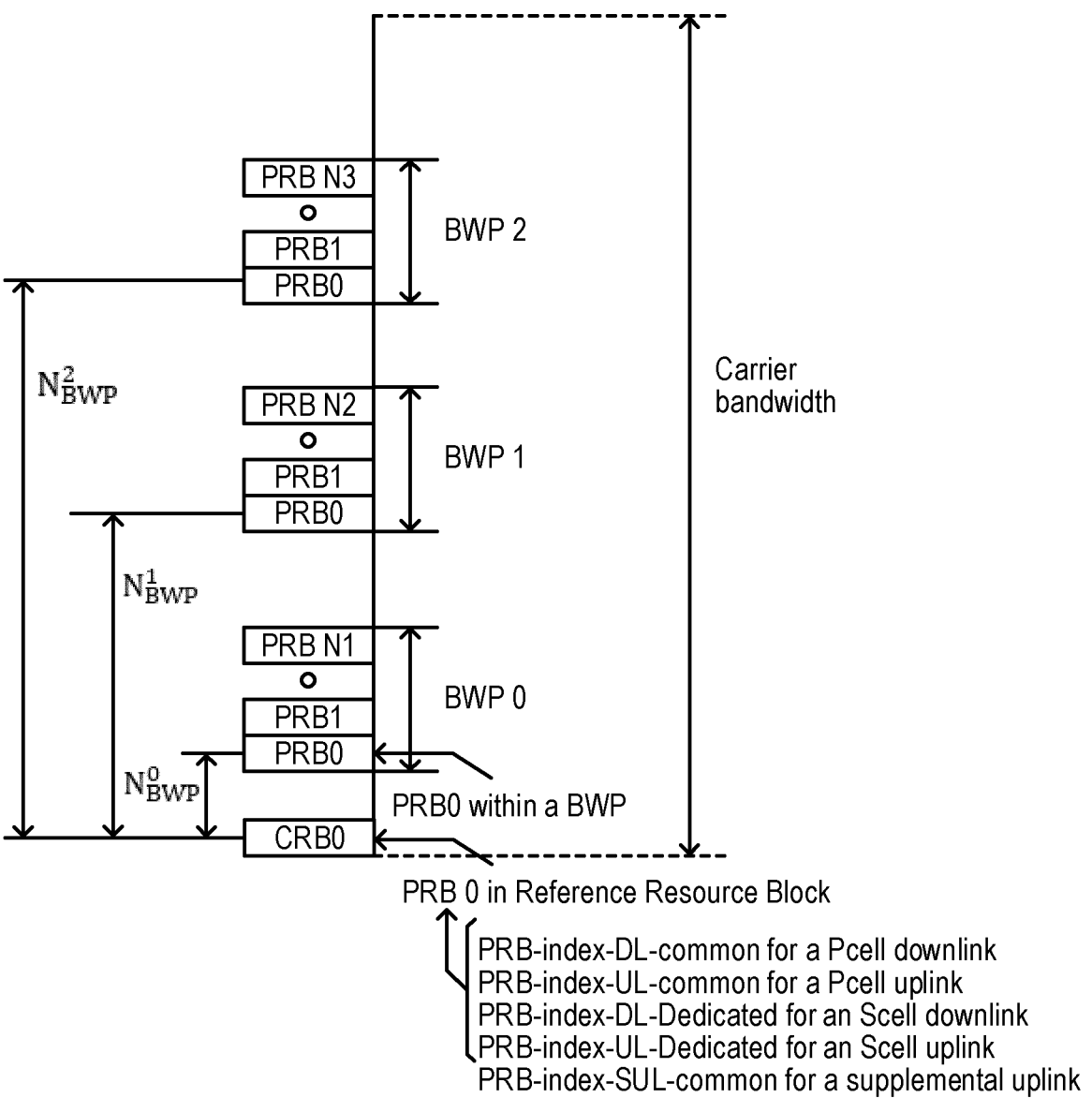
FIG. 5 shows an exemplary arrangement of a New Radio (NR) timeslot, including an exemplary time-frequency resource grid.

FIG. 5 shows an exemplary frequency-domain configuration for an NR UE. In Ra-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $N_{BWPi}^{size}$-1, where i is the index of the particular BWP for the carrier. In the arrangement shown in FIG. 5, BWPs 0-2 include PRBs 0 to N1, N2, and N3, respectively.

Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu$=0 (i.e., $\Delta f$=15 kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f$=15 kHz, two 0.5-ms FIG. 6 shows an exemplary time-frequency resource grid for an NR slot. As illustrated in FIG. 6, a resource block (RB) consists of a group of 12 contiguous OFDM subcarriers for a duration of a 14-symbol slot. Similar to LTE, a resource element (RE) consists of one subcarrier in one slot. An NR slot can include 14 OFDM symbols for normal cyclic prefix and 12 symbols for extended cyclic prefix. An NR slot can also be arranged with various combinations of UL and DL symbols. Options can include DL-only slots (i.e., no UL transmission) with on-time (symbol 0) or late (symbol>0) starts, "DL-heavy" slots (e.g., one UL symbol), and "UL-heavy" slot with a single DL symbol carrying DL control information. Various guard periods before initial DL symbols ($T_{UL\text{-}DL}$) and before initial UL symbols ($T_{DL\text{-}UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

In NR, the physical downlink control channel (PDCCH) transmitted by a gNB is confined to a region containing a particular number of symbols and a particular number of subcarriers, referred to as the control resource set (CORESET). For example, the CORESET can include the first two symbols of a slot and each of the remaining 12 symbols can contain physical data channels (PDCH), i.e., either DL (PDSCH) or UL (PUSCH). Depending on specific CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. The smallest unit used for defining CORESET is resource element group (REG), which spans one PRB in frequency and one OFDM symbol in time. A CORESET is functionally similar to the control region in LTE subframe. In NR, however, each REG consists of all 12 REs of one OFDM symbol in an RB, whereas an LTE REG includes only four REs. Like in LTE, the CORESET time domain size can be indicated by the physical control format indicator (CFI) channel (PCFICH). In LTE, the frequency bandwidth of the control region is fixed (i.e., to the total system bandwidth), whereas in NR, the frequency bandwidth of the CORESET is variable. CORESET resources can be indicated to a UE by radio resource control (RRC) signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2. Similar techniques can be used by the UE for PUSCH transmission scheduled by DCI (e.g., formats 0_0 or 0_1).

In both LTE and NR, UEs transmit UCI (Uplink Control Information) UEs on the physical UL control channel (PUCCH). For example, UCI can include HARQ feedback, CSI (Channel State Information) feedback, and SR (Scheduling Requests). Currently there are five different PUCCH formats (0-4) defined for carrying different types of UCI, where the sizes of the various formats range from one to 14 OFDM symbols. The various PUCCH formats are further defined in 3GPP TS 38.211.

NR supports two types of pre-configured resource assignments, both of which are similar to existing LTE semi-persistent scheduling (SPS) with some enhancements such as support for transport block (TB) repetitions. In type 1, UL data transmission with configured grant is only based on RRC (re)configuration without any L1 signaling. Type 2 is similar to the LTE SPS feature. UL data transmission with configured grant is based on both RRC configuration and layer-1 (L1) signaling for activation/deactivation of the grant. In this case, a gNB needs to explicitly activate the configured resources on PDCCH and the UE confirms reception of the activation/deactivation grant using a MAC control element.

As briefly mentioned above, broadcast, groupcast, and unicast transmission is supported for NR SL operation between two UEs. For unicast and groupcast SL transmissions, two types of HARQ feedback are supported. FIG. 7A shows a first type of NR SL HARQ based on ACK/NACK. When configured according to the first type of HARQ, UE 710 receiving (RX) a Transport Block (TB) of data sends an ACK or NACK to transmitting UE 700 indicating that the TB was received correctly or incorrectly, respectively. Upon receiving a NACK, transmitting UE 700 will retransmit the same TB until receiving an ACK or reaching the maximum number of retransmissions.

FIG. 7B shows a second type of NR SL HARQ based only on NACK. In this arrangement, UE 710 receiving a TB is configured to send NACK when the TB is received incorrectly but does not send any feedback when the TB is received correctly. For example, if receiving UE 710 decodes a scheduling assignment (SA, e.g., in DCI) but fails to decode the associated TB, it transmits a NACK. On the other hand, the UE sends no feedback if it correctly decodes both SA and associated TB or if it fails to decode the SA. If transmitting UE 700 does not receive a NACK, it assumes that the TB it transmitted was correctly received and can therefore transmit new TBs. However, this arrangement does not distinguish between non-feedback cases of failed SA decoding or successful SA and TB decoding.

From another perspective, an NR HARQ process can be either synchronous or asynchronous. For synchronous HARQ in UL and DL (i.e., non-SL) cases, a UE must use a specific HARQ process in a certain subframe. Due to this implicit relationship, the network does not need to include HARQ process information in DCI. For asynchronous HARQ in UL and DL (i.e., non-SL) cases, there is no implicit relationship between subframe and HARQ process. Consequently, the network must provide explicit HARQ process information in DCI. Asynchronous adaptive HARQ is also supported for NR UL, DL, and SL.

Two types of resource allocation modes are supported for NR SL transmissions between UEs. In NR SL resource allocation mode 2, the resource allocation is performed by UE itself, e.g., autonomously based on sensing the carrier/ resource pool for availability. In particular, the UE determines available resources by decoding sidelink control information (SCI) received from other UEs and/or energy sensing and selects a set of idle/available resources to use for its SL transmission. This can be done in a similar manner as described above in relation to DCI.

In NR SL resource allocation mode 1, all SL transmissions between UEs are scheduled by the network (e.g., a serving gNB) using a configured grant or a dynamic grant. The network (e.g., serving gNB) can provide a UE with configured SL grant via radio resource control (RRC) configuration. Configured SL grants typically allocate resources having a periodic, semi-persistent pattern. Two types of configured SL grants are available, i.e., types 1 and 2. In type 2, the network can activate/deactivate the RRC-configured grant using DCI signaling.

On the other hand, dynamic grants are based on data being available for SL transmission, which triggers a buffer status report (BSR) by the UE having the data to send. If the UE already has an UL grant with enough resources, it will send the BSR to the gNB using these resources. Otherwise, it will trigger a SL scheduling request (SR) and send BSR on resources indicated by the UL grant in the responsive DCI from the gNB. After receiving the BSR, the gNB performs resource allocation and provides a SL grant to UE via downlink control information (DCI).

This SR/BSR scheme for SL (e.g., PC5 interface) follows similar principles as the SR/BSR scheme for UL/DL (e.g., Uu interface). For example, like Uu, NR SL also supports configuration of multiple dedicated SL SRs. Each SR configuration can be mapped to one or more logical channels, so that the UE uses the specific SR configuration depending on the logical channel (as indicated by a logical channel ID, or LCID) associated with the data available in the SL buffer. In addition, the UE may also use SL BSR to indicate the amount of data available in the SL buffer. Similar to Uu procedures, if there are insufficient UL resources available for the UE to transmit the triggered SL BSR, the UE will first send a SL SR and the network (e.g., gNB) will provide an UL grant for transmitting the BSR.

Retransmissions in NR SL resource allocation mode 1 are also scheduled by the gNB. To support this functionality, a UE sends explicit SL HARQ feedback to the gNB, based on the ACK/NACK feedback exchanged with the other UE via SL.

FIG. 8 shows an exemplary SL BSR medium access control (MAC) control element (CE). This exemplary CE can include buffer sizes associated with up to N different logical channel group (LCG) IDs, where each LCG is asociated with one or more logical channels (LCs). Each buffer size and LCG ID is also accompanied by a destination index that refers to a specific layer-2 destination. Each destination index can be assigned by higher layers and can identify an individual or group.

A logical channel prioritization (LCP) procedure is applied when a new SL transmission is performed by a UE. When the UE's MAC entity allocates resources to SL logical channels (LCHs) having data available for transmission, it should first select the Layer-2 destination (identified by a destination index, such as shown in FIG. 8) having the highest priority LCH among all SL LCHs having data for transmission to any Layer-2 destination. After this, SL LCHs belonging to the selected Layer-2 destination are served in decreasing order of priority until either the data for the SL LCH(s) or the SL grant is exhausted, whichever comes first.

In UL transmission, the LCP procedure is similar with the general rule that the data from starved LCH should be transmitted first, and data from LCH of higher priority should be transmitted first. In addition, the UE is subject to the following restrictions configured by the network when selecting LCHs to transmit using a particular UL grant:

allowedSCS-List, which sets the allowed Subcarrier Spacing(s) for transmission;

maxPUSCH-Duration, which sets the maximum PUSCH duration allowed for transmission;

configuredGrantType1Allowed, which sets whether a configured grant Type 1 can be used for transmission; and allowedServingCells, which sets the allowed cell(s) for transmission.

Even so, there are various problems, issues, and/or drawbacks with respect to HARQ feedback in NR SL operation, particularly in relation to NR SL resource allocation mode 1 in which all SL transmissions between UEs are scheduled by the network. For example, the network may expect an ACK/NACK feedback for a SL grant, but the UE may use the assigned SL grant for other transmissions that do not request HARQ feedback. As a consequence, it is problematic for the network to associate received feedback with a corresponding SL grant.

In addition, HARQ procedures should be configured according to the QoS requirements of the associated SL LCH (or SL radio bearer, SLRB). For example, a service requiring high reliability should be configured with HARQ feedback. Furthermore, a SL resource pool may or may not be configured with a Physical Sidelink Feedback Channel (PSFCH). As such, the relationship between the SL resource pool configuration and SL LCH HARQ configuration is unclear when the network provides the configuration, but the UE selects resources for SL transmission.

Exemplary embodiments of the present disclosure address these and other problems, difficulties, and/or issues by providing mechanisms to support SL retransmission taking into account both the HARQ configuration of a SL LCH (or SLRB) and the configuration of the SL resource pool and/or resource grant. For example, when the network (e.g., serving gNB) provides SL resource pool and/or resource grant to the UE, the network can explicitly indicate an associated HARQ mode or configuration (e.g., whether this SL grant requires a HARQ feedback) or explicitly indicate an association between the resource pool and/or resource grant and a UE SL LCH. Subsequently, when a UE has data available on a particular SL LCH that requires a particular HARQ configuration, the UE transmits the data using a granted SL resource (e.g., in a resource pool) having an HARQ configuration that matches the required particular HARQ configuration.

In this manner, embodiments restrict the use of a particular SL grant by a UE, enabling the network to track the ACK/NACK status of a previously assigned SL grant and thereby ensuring proper scheduling for SL retransmission. Embodiments also provide rules and/or guidelines whereby a UE can take into account the HARQ configuration of a SL LCH when selecting a SL resource pool or resource grant for (re)transmission, thereby improving the performance of UE SL (re)transmissions.

In general, various embodiments described herein relate to scenarios in which multiple services are running in a SL-capable UE, with the services being mapped to different SL LCHs at the access stratum (AS). These services may have diverse QoS requirements (e.g., in terms of reliability and latency), with HARQ configurations being appropriate for the services associated with the respective SL LCHs. For example, a SL LCH supporting high reliability and high latency services is configured such that the UE transmitting SL data associated with these services expects HARQ feedback (e.g., ACK/NACK) from the UE receiving the data. Also in these exemplary scenarios, various SL resource pools can be configured differently in terms of HARQ support, e.g., some SL resource pools are configured with PSFCH for carrying HARQ, while others are not.

At at high level, in various embodiments, HARQ configuration associated with a SL LCH can be used to perform resource pool/carrier/resource grant selection, either by the serving network node (e.g., gNB, in SL mode 1) or by the D2D UE (e.g., in SL mode 2). In some embodiments, such information can also be used by the UE in a LCP procedure (e.g., in SL mode 1). In particular, if a LCH with SL data for transmission is configured with HARQ retransmissions requiring feedback, the UE can schedule and/or prioritize the LCH based on the presence/availability of HARQ feedback.

The following describes in more detail various embodiments that include operations performed by the network, by a D2D-capable UE, and/or by both. Unless specifically noted to the contrary, these described operations pertain to both SL modes (i.e., 1 and 2) of SL resource allocation described above. Furthermore, unless specifically noted otherwise, different ones of these described embodiments can be combined in various ways to provide various benefits.

A first group of embodiments are related to network-side operations to support SL retransmission between D2D UEs. References below to "the network" can be interpreted as referring to a particular network node, such as a network node (e.g., gNB) serving a cell in which at least one of the D2D UEs is located (i.e., the UE's serving cell provided by the UE's serving network node). In some of these embodiments, when the network provides a dynamic or configured SL grant to a UE, the network also indicates the HARQ configuration associated with the SL grant. For example, the HARQ configuration can be any of the following:

ACK/NACK feedbacks are supported;

Only NACK feedback is supported;

Any type of HARQ feedback (i.e., ACK/NACK or only-NACK) is supported; or

No HARQ feedback is supported.

In general, the first three of these case can be considered as HARQ feedback enabled (albeit in different forms), while the four of these cases can be considered as HARQ feedback disabled.

In some embodiments, when the network provides a dynamic/configured SL grant to a UE, the network also indicates that the SL dynamic/configured grant can be used for one of the following:

Initial transmission only;

Retransmission only; or

Both initial transmission and retransmission.

In some embodiments, the HARQ configuration provided by the network in the dynamic or configured SL grant also indicates the PUCCH resources (e.g., time, frequency, code) and the PUCCH format to be used by the UE for the forwarding of SL feedback to the network node. For instance, in case of 1-2 bits SL HARQ feedback, sequence-based PUCCH format can be used for HARQ feedback forwarding.

In some embodiments, the HARQ configuration can be provided by the network in an RRC message. These embodiments can be beneficial for configured grant type 1 where DCI and resources are semi-statically configured using RRC signaling. In addition, these embodiments can be beneficial for configured grant type 2.

In some embodiments, the network can select the dynamic or configured SL grant from a carrier/resource pool that supports the required HARQ configuration. For example, a SL grant expecting a ACK/NACK feedback must be selected from a SL transmit resource pool that includes PSFCH resources for carrying such feedback.

In some embodiments, when the network receives a SL SR from a UE, the SR may or may not reflect the associated SL LCH. If the network can deduce the SL LCH that triggered the SL SR, the network can provide a dynamic SL grant associated with the same HARQ configuration as the originating SL LCH without waiting for a SL BSR. If the network cannot deduce the SL LCH that triggers the SL SR, the network does not provide any SL dynamic grant before receiving SL BSR which conveys SL LCH information.

In some embodiments, when the network receives a SL BSR from the UE including SL LCH information, the network should in principle consider higher priority SL LCH(s) first when generating the SL dynamic grant. In some scenarios, however, the SL resource pool supporting HARQ configurations of the higher priority SL LCH(s) can be full/unavailable. In this case, the network can assign a dynamic SL grant for lower-priority SL LCH(s).

In some embodiments, if one dynamic or configured SL grant (e.g., SL grant 1) requiring HARQ feedback is assigned to a UE, the network reserves the relevant information (e.g., grant size, HARQ configuration) until the SL transmission using SL grant 1 is determined to be successful or not. If the SL transmission using SL grant 1 is successful, the relevant information can be removed. If the SL transmission using SL grant 1 is unsuccessful, the network will provide another SL grant (e.g., SL grant 2) for SL retransmission. The size of SL grant 2 can be either the same as SL grant 1 or at least sufficient for the TB size and modulation and coding scheme (MCS) for the retransmission.

In some embodiments, the network can send a set of configured SL grants to a UE and subsequently enable individual grants based on the QoS requirements SL LCH or the SL SR. In one of these embodiments, a set of configured SL grants provided to the UE can support different HARQ configurations. In other embodiments, a set of configured SL grants provided to the UE may contain different explicit mappings between SL carrier/resource pools and UE SL LCH. Furthermore, the network can send a bitmap to activate one SL configured grant out of the configured set. In other embodiments, the network may send a list of configured SL grants ordered according to priority. For example, the list could instruct/configure the UE to first transmit in resources associated with the first grant in the list and, if the SL transmission using that first grant fails, then transmit in resources associated with the second grant in the list, and so on. Such embodiments can also be used advantageously with dynamic SL grants.

In some embodiments, the network may activate/deactivate one or more of the configured SL grants (out of the overall set) via dedicated RRC signalling with a particular UE. In other embodiments, the network may activate/deactivate one or more of the configured SL grants via broadcast system information blocks (SIBs). In other embodiments, the network may activate/deactivate one or more of the configured SL grants via DCI signaling.

In some embodiments, for SL resource allocation mode 2 (i.e., UE autonomous), each SLRB/LCH is configured with a list of candidate SL carrier/resource pools taking into account the authorized frequencies of supported services and/or HARQ configurations. Such SLRB/LCH-to-SL carrier/resource pools mapping can be configured by the network via dedicated RRC signalling to a particular UE, or via broadcast SIB message. Alternately, such mapping can be pre-configured, e.g., as specified in a 3GPP standard.

In some embodiments, when the network receives SL QoS flow and service information from UE, the network provides mode-2 SLRB/LCH configuration considering the SL resource pool configurations. If the network configures a new SLRB/LCH to support the SL QoS flow, the provided SL resource pool(s) should support a HARQ configuration associated with the required QoS (e.g., PSFCH resources for carrying HARQ for high-reliability QoS). Furthermore, SL resource pool(s) must be in frequency spectrum in which the UE and/or underlying service is authorized to operate. In other embodiments, the network may map the SL QoS flow to an existing SLRB/LCH (i.e., one SLRB/LCH supporting multiple QoS flows). In this case, the network has to ensure different SL QoS flows/services mapped to the same SLRB/LCH have the common candidate SL resource pools.

A second group of embodiments are related to UE-side operations to support SL retransmission between D2D UEs. As above, references below to "the network" can be interpreted as referring to a particular network node, such as a network node (e.g., gNB) serving a cell in which at least one of the D2D UEs is located (i.e., the UE's serving cell provided by the UE's serving network node).

In some embodiments, for SL resource allocation mode 1 (i.e., network assigned), when a UE selects SL LCH(s) for transmission on a provided dynamic or configured SL grant, only SL LCHs of the same HARQ configuration as indicated in SL grant will be transmitted. For example, if the SL grant is for a transmission with ACK/NACK feedback, only SL LCH(s) configured to support ACK/NACK feedback will be selected. Furthermore, among the selected SL LCH(s), UE can further select the SL destination ID and SL LCH(s) for transmission based on existing LCP procedures, such as described above.

In some embodiments, for SL resource allocation mode 2 (i.e., UE autonomous), the UE selects a transmission resource pool out of the sets of pools configured by the network (or preconfigured) based on the LCH configuration being scheduled. For example, a SL LCH supporting ACK/NACK feedback can only use resources from SL resource pool configured with PSFCH resources, while a SL LCH not supporting HARQ feedback can select any available SL resource pool.

In some embodiments, the configuration of HARQ and LCH(s) is provided to the UE by a network node or is pre-configured in the UE. In some embodiments, the configuration of resource pools (including information about resources for HARQ feedback) is provided to the UE by a network node or is pre-configured in the UE.

The following examples are provided to illustrate various disclosed embodiments and are not intended to be limiting. In a first example, a UE operates in SL resource allocation mode 2 in which the UE autonomously selects SL resources. The UE receives the following from the network (e.g., serving gNB):

A configuration that associates one or more HARQ modes with one or more LCHs. For example, the use of HARQ feedback may be allowed/mandated for LCH1 and may be disabled for LCH2.

A pool configuration, including information about HARQ (e.g., whether HARQ is allowed, allowed HARQ modes, HARQ feedback resources, etc.). For example, pool 1 can include resources for transmission of HARQ feedback (e.g., PSFCH) and pool 2 can include no resources for transmission of HARQ feedback.

In response to having packet(s) in the buffer for a particular LCH, the UE selects a resource pool and particular resources in the pool to use for transmission. In performing this selection, the UE considers the HARQ-LCH configuration. For example, if the UE has LCH1 data to transmit, then it selects resources from pool 1. If the UE has LCH2 data to transmit, then it selects resources from pool 2. The UE transmits the data in the selected resources.

In a second example, a UE operates in SL resource allocation mode 1 in which the UE transmits on resources granted by the network. The UE receives the following from the network (e.g., serving gNB):

A configuration that associates one or more HARQ modes with one or more LCHs. For example, the use of HARQ feedback may be allowed/mandated for LCH1 and may be disabled for LCH2.

A resource grant for SL transmission. The grant contains information about HARQ (e.g., whether HARQ is allowed, allowed HARQ modes, HARQ feedback resources, etc.). The grant also contains the resources to use for transmission.

From among its LCHs having buffered data to transmit, the UE selects a LCH having an HARQ configuration that is compatible with the HARQ configuration of the grant. For example, if the grant allows/mandates the use of HARQ feedback, then the UE selects data from LCH1. But if the grant does not allow HARQ feedback, the UE selects data from LCH2. The UE then transmits the data in the granted resources.

In a third example, a UE operates in SL resource allocation mode 1 in which the UE transmits on resources granted by the network. The UE receives the following from the network (e.g., serving gNB):

A configuration that associates one or more HARQ modes with one or more LCHs. For example, the use of HARQ feedback may be allowed/mandated for LCH1 and may be disabled for LCH2.

A configuration of one or more resource pools, including HARQ-related information for each of the resource pools (e.g., whether HARQ is allowed, allowed HARQ modes, HARQ feedback resources, etc.). For example, pool 1 can include resources for transmission of HARQ feedback and pool 2 can include no resources for transmission of HARQ feedback.

A grant of resources for SL transmission. The grant may allow the UE to identify the particular pool to which the resources belong. For example, it may contain a pool index. Alternatively, the UE can identify the particular pool based on both the received grant and the received pool configuration.

From among its LCHs having buffered data to transmit, the UE selects a LCH having an HARQ configuration that is compatible with the HARQ configuration associated with the identified pool. For example, if pool 1 is identified, which allows/mandates the use of HARQ feedback, the UE selects data from LCH 1; if pool 2 is identified, which does not allow the use of HARQ feedback, the UE selects data from LCH 2. The UE then transmits the data in the granted resources.

The embodiments described above can be further illustrated with reference to FIGS. 9-10, which depict exemplary methods performed by a network node and a UE, respectively. In other words, various features of operations described below correspond to various aspects of embodiments described above. In some scenarios, the exemplary methods shown in FIGS. 9-10 can be used cooperatively with each other to provide various exemplary benefits described herein. Although the exemplary methods are illustrated in FIGS. 9-10 by specific blocks in particular orders, the operations corresponding to the blocks can be performed in different orders than shown and can be combined and/or divided into blocks having different functionality than shown. Optional blocks and/or operations are indicated by dashed lines.

More specifically, FIG. 9 illustrates an exemplary method (e.g., procedure) for providing resources for device-to-device (D2D) wireless communication between a first user equipment (UE) and a second UE, in accordance with various exemplary embodiments of the present disclosure. The exemplary method shown in FIG. 9 can be performed by a network node (e.g., base station, eNB, gNB, ng-eNB, en-gNB, etc. or component thereof) in a wireless network (e.g., E-UTRAN, NG-RAN, etc.).

The exemplary method shown in FIG. 9 can include the operations of block 910, where the network node can transmit, to the first UE, a configuration that identifies one or more sidelink (SL) channels between the first UE and the second UE, and one or more first hybrid ARQ (HARQ) feedback modes associated with the respective one or more SL channels. The exemplary method can also include the operations of block 950, where the network node can transmit, to the first UE, resource information identifying resources usable for communicating via the one or more SL channels.

In some embodiments, the resource information can identify a plurality of resource pools from which the first UE can select resources for transmitting data associated with the one or more SL channels, and a respective plurality of second HARQ feedback modes associated with the resource pools. Such embodiments correspond to SL mode 2, discussed above, in which a UE can autonomously select resources from the provide resource pools.

In other embodiments, the exemplary method can also include the operations of block 920, where the network node can receive, from the first UE, a buffer status report (BSR) including identifiers of ones of the SL channels having data buffered for transmission. The network node can perform various operations in response to the BSR, as discussed below.

In some of these embodiments, the exemplary method can also include the operations of block 930, where the network node can select resources from a resource pool having an associated second HARQ feedback mode that matches the first HARQ feedback mode associated with the ones of the SL channels having data buffered for transmission. In such embodiments, the resource information (e.g., sent in block 950) can include a grant of the selected resources (e.g., for SL transmission by the first UE). Furthermore, the resource information can also identify the second HARQ feedback mode associated with the selected resources. The second example discussed above is an example of such embodiments.

In some of these embodiments, the resource information also identifies physical uplink control channel (PUCCH) resources for the first UE. In such embodiments, the exemplary method can also include the operations of block 960, where the network node can receive, from the first UE via the identified PUCCH resources, HARQ feedback associated with the grant of the selected resources. For example, the network node can use such HARQ feedback to determine whether scheduling of resources for retransmissions is required.

In other of these embodiments, the configuration (e.g., sent in block 910) can also identify a plurality of resource pools from which the first UE can select resources for transmitting data associated with the one or more SL channels, as well as a plurality of second HARQ feedback modes associated with the respective resource pools. In such embodiments, the exemplary method can also include the operations of block 940, where the network node can select a resource pool having an associated second HARQ feedback mode that matches the first HARQ feedback mode associated with the ones of the SL channels having data buffered for transmission. In such embodiments, the resource information (e.g., sent in block 950) can identify the selected resource pool. The third example discussed above is an example of such embodiments.

In various embodiments, each second HARQ feedback mode associated with selected resources or a selected resource pool can be HARQ enabled or HARQ disabled. In some embodiments, the following applies to each second HARQ feedback mode associated with selected resources or resource pool:

when a second HARQ feedback mode is HARQ enabled, the associated selected resources or resource pool include physical sidelink feedback channel (PSFCH) resources; and when a second HARQ feedback mode is HARQ disabled, the associated selected resources or resource pool exclude PSFCH resources.

Likewise, in various embodiments, each first HARQ feedback mode associated with a respective channel can be HARQ enabled or HARQ disabled. In some of these embodiments, when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

In some embodiments, the resource information can also indicate whether the identified resources (e.g., selected resources, selected resource pool, or plurality of resource pools) can be used for initial transmissions and/or retransmissions.

In addition, FIG. 10 illustrates an exemplary method (e.g., procedure) for device-to-device (D2D) wireless communication by a first user equipment (UE) to a second UE in a wireless network, in accordance with various embodiments of the present disclosure. The exemplary method shown in FIG. 10 can be performed by a UE (e.g., wireless device, V2X UE, D2D UE, etc.) configured as shown in other figures herein.

The exemplary method can include the operations of block 1070, where the first UE can transmit, to the second UE, buffered data for a particular sidelink (SL) channel between the first UE and the second UE, using resources that are compatible with a first hybrid ARQ (HARQ) mode associated with the particular SL channel. Other optional operations are described below.

In some embodiments, the particular SL channel and the associated first HARQ feedback mode are part of a configuration, stored at the first UE, that associates one or more SL channels and respective one or more first HARQ feedback modes. In some embodiments, the exemplary method can also include the operations of block 1010, where the first UE can receive the configuration from the network node (e.g., before storing the configuration). In such embodiments, the exemplary method can include the operations of block 1030, where the first UE can receive, from the network node, resource information that identifies resources usable for communicating via one or more SL channels. These identified resources can include the resources used for transmitting the buffered data (e.g., in block 1070). Various resource arrangements are described below.

Note that in other embodiments, the configuration can be stored (e.g., pre-configured) in the first UE without receiving it from the network node. However, this arrangement does not preclude the first UE from receiving the resource information in block 1030.

In some embodiments, the exemplary method can include the operations of block 1020, where the first UE can transmit, to the network node, a buffer status report (BSR) including identifiers of ones of the SL channels having data buffered for transmission. In such embodiments, the resource information can be received (e.g., in block 1030) in response to the BSR.

In some of these embodiments, the resource information can include a grant of the resources used for transmitting the buffered data (e.g., in block 1070), as well as a second HARQ feedback mode, associated with the granted resources, that is compatible with the first HARQ feedback mode associated with the particular SL channel. The second example discussed above is an example of such embodiments.

Furthermore, in some of these cases, the resource information can also identify physical uplink control channel (PUCCH) resources for the first UE. In such embodiments, the exemplary method can also include the operations of block 1080, where the first UE can transmit, to the network node via the identified PUCCH resources, HARQ feedback related to the granted resources. As mentioned above, the network node can use such HARQ feedback to determine whether scheduling of resources for retransmissions is required.

In other of these embodiments, the configuration (e.g., received in block 1010) can also identify a plurality of resource pools from which the first UE can select resources for transmitting data associated with the one or more SL channels, as well as a plurality of second HARQ feedback modes associated with the respective resource pools. In such embodiments, the resource information can identify a particular one of the resource pools having an associated second HARQ feedback mode that matches the first HARQ feedback mode associated with the particular SL channel. Furthermore, the exemplary method can also include the operations of block 1040, where the first UE can select, from the particular resource pool, the particular resources used for transmitting the buffered data. The third example discussed above is an example of such embodiments.

In other embodiments, the resource information can identify a plurality of resource pools from which the first UE can select resources for transmitting data associated with the one or more SL channels, as well as a respective plurality of second HARQ feedback modes associated with the resource pools. In such embodiments, the exemplary method can also include the operations of blocks 1050-1060. In block 1050, the first UE can select one of the identified resource pools having an associated second HARQ feedback mode that matches the first HARQ feedback mode associated with the particular SL channel In block 1060, the first UE can select, from the selected resource pool, the particular resources for transmitting the buffered data for the particular SL channel. These embodiments are exemplified by SL mode 2 and the first example discussed above.

In various embodiments, each second HARQ feedback mode associated with granted resources or an identified resource pool can be HARQ enabled or HARQ disabled. In some embodiments, the following applies to each second HARQ feedback mode associated with granted resources or an identified pool:

when a HARQ feedback mode is HARQ enabled, the associated granted resources or identified resource pool include physical sidelink feedback channel (PSFCH) resources; and when a second HARQ feedback mode is HARQ disabled, the associated granted resources or identified resource pool exclude PSFCH resources.

Likewise, in various embodiments, each first HARQ feedback mode associated with a respective channel can be HARQ enabled or HARQ disabled. In some of these embodiments, when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

In some embodiments, the resource information (e.g., received in block 1030) can also indicate whether the identified resources (e.g., granted resources, identified resource pool, or plurality of resource pools) can be used for initial transmissions and/or retransmissions.

Figure 11:
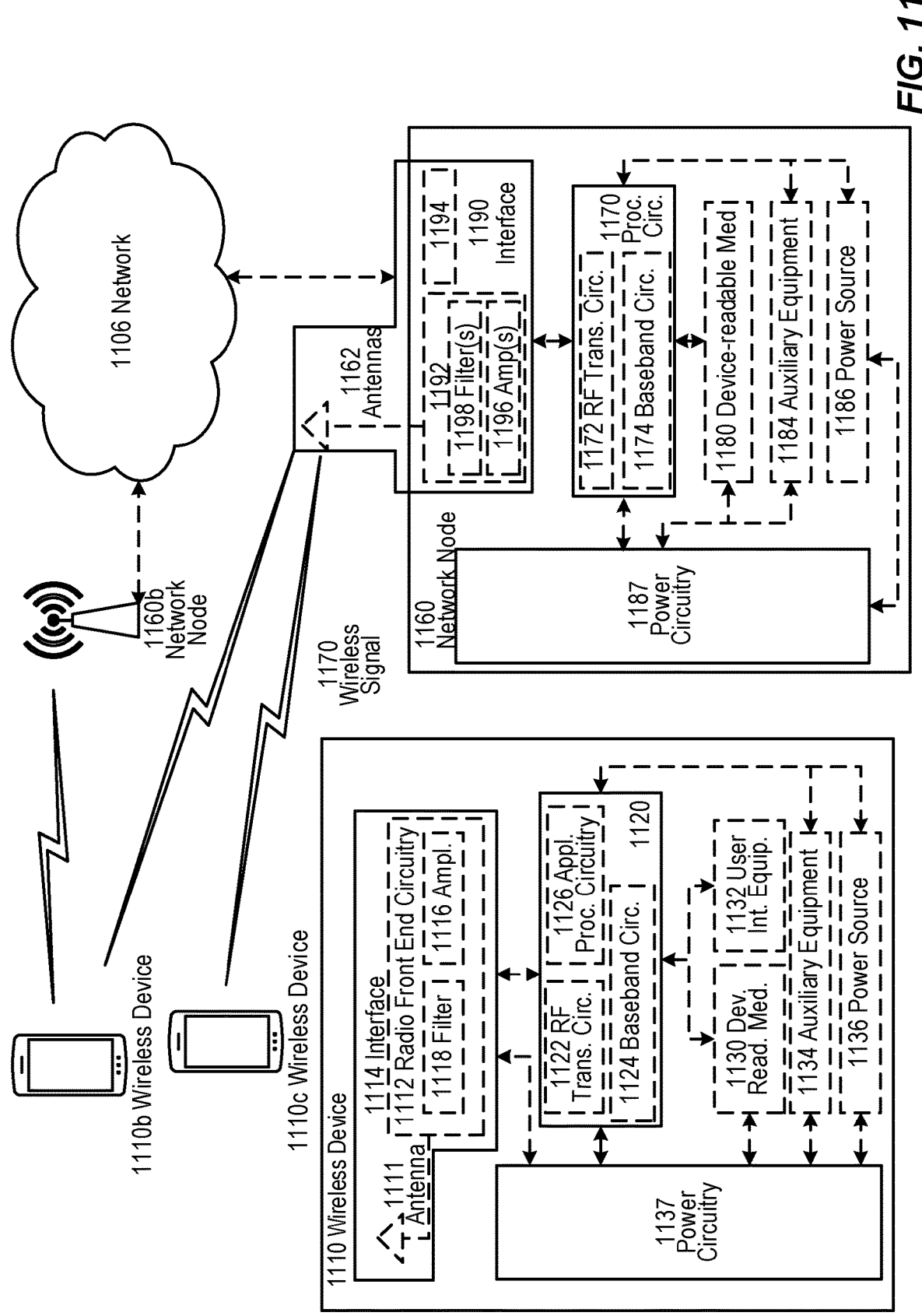
FIG. 11 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and an RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1160, either alone or in conjunction with other network node 1160 components (e.g., device readable medium 1180). Such functionality can include any of the various wireless features, functions, or benefits discussed herein.

For example, processing circuitry 1170 can execute instructions stored in device readable medium 1180 or in memory within processing circuitry 1170. In some embodiments, processing circuitry 1170 can include a system on a chip (SOC). As a more specific example, instructions (also referred to as a computer program product) stored in medium 1180 can include instructions that, when executed by processing circuitry 1170, can configure network node 1160 to perform operations corresponding to various exemplary methods (e.g., procedures) described herein.

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120 and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1110 functionality either alone or in combination with other WD 1110 components, such as device readable medium 1130. Such functionality can include any of the various wireless features or benefits discussed herein.

For example, processing circuitry 1120 can execute instructions stored in device readable medium 1130 or in memory within processing circuitry 1120 to provide the functionality disclosed herein. More specifically, instructions (also referred to as a computer program product) stored in medium 1130 can include instructions that, when executed by processor 1120, can configure wireless device 1110 to perform operations corresponding to various exemplary methods (e.g., procedures) described herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110 and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
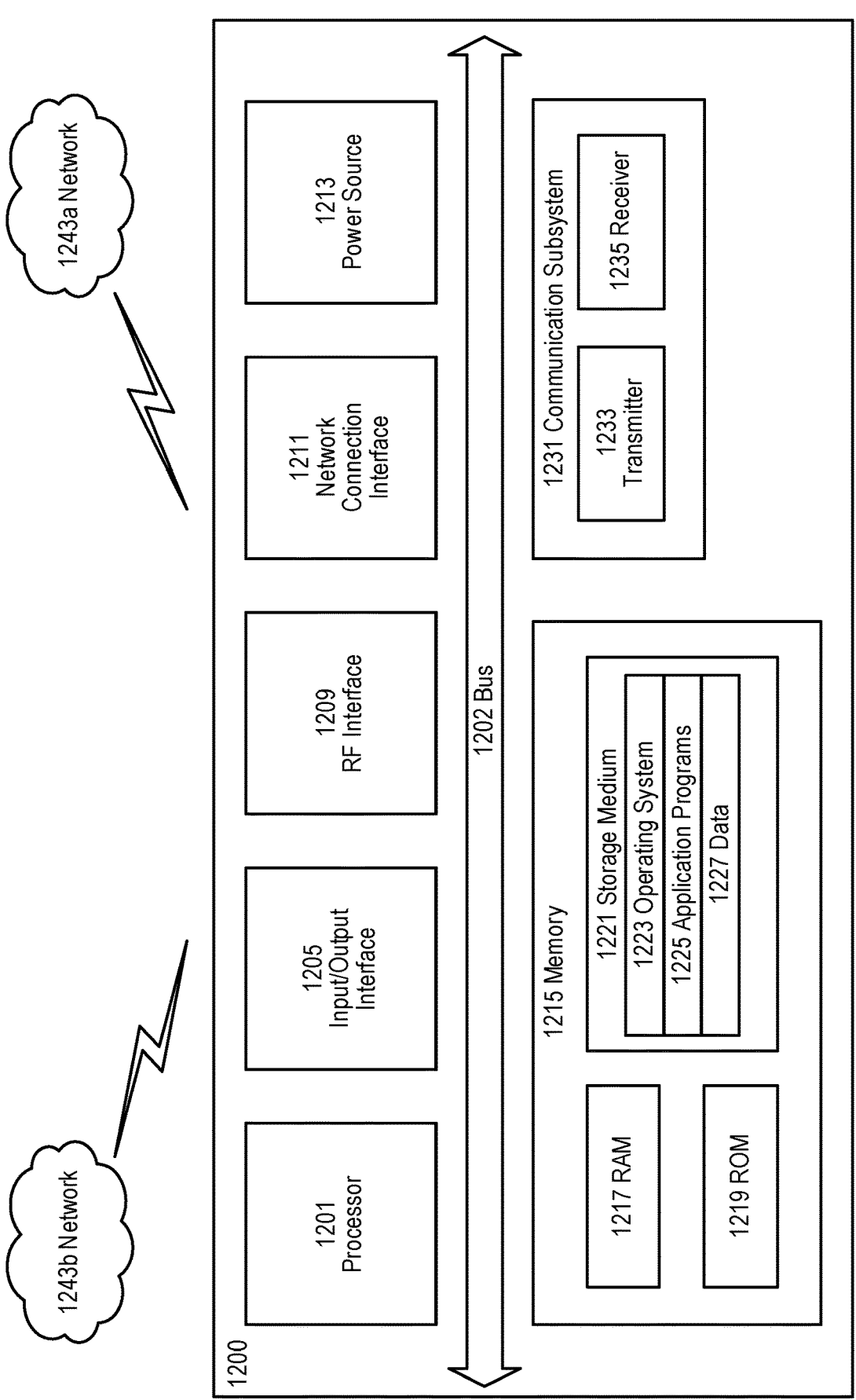
FIG. 12 is a block diagram of an exemplary user equipment (UE) configurable according to various exemplary embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 12200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243*a*. Network 1243*a* can encompass wired and/or wireless networks such as a local-area network (LAN), a wide-area network (WAN), a computer network, a wireless network, a telecommunications network, another like network or any combination thereof. For example, network 1243*a* can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1221 can be configured to include operating system 1223; application program 1225 such as a web browser application, a widget or gadget engine or another application; and data file 1227. Storage medium 1221 can store, for use by UE 1200, any of a variety of various operating systems or combinations of operating systems. For example, application program 1225 can include executable program instructions (also referred to as a computer program product) that, when executed by processor 1201, can configure UE 1200 to perform operations corresponding to various exemplary methods (e.g., procedures) described herein.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243*b* using communication subsystem 1231. Network 1243*a* and network 1243*b* can be the same network or networks or different network or networks. Communication subsystem 1231 can be configured to include one or more transceivers used to communicate with network 1243*b*. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243*b* can encompass wired and/or wireless networks such as a local-area network (LAN), a wide-area network (WAN), a computer network, a wireless network, a telecommunications network, another like network or any combination thereof. For example, network 1243*b* can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
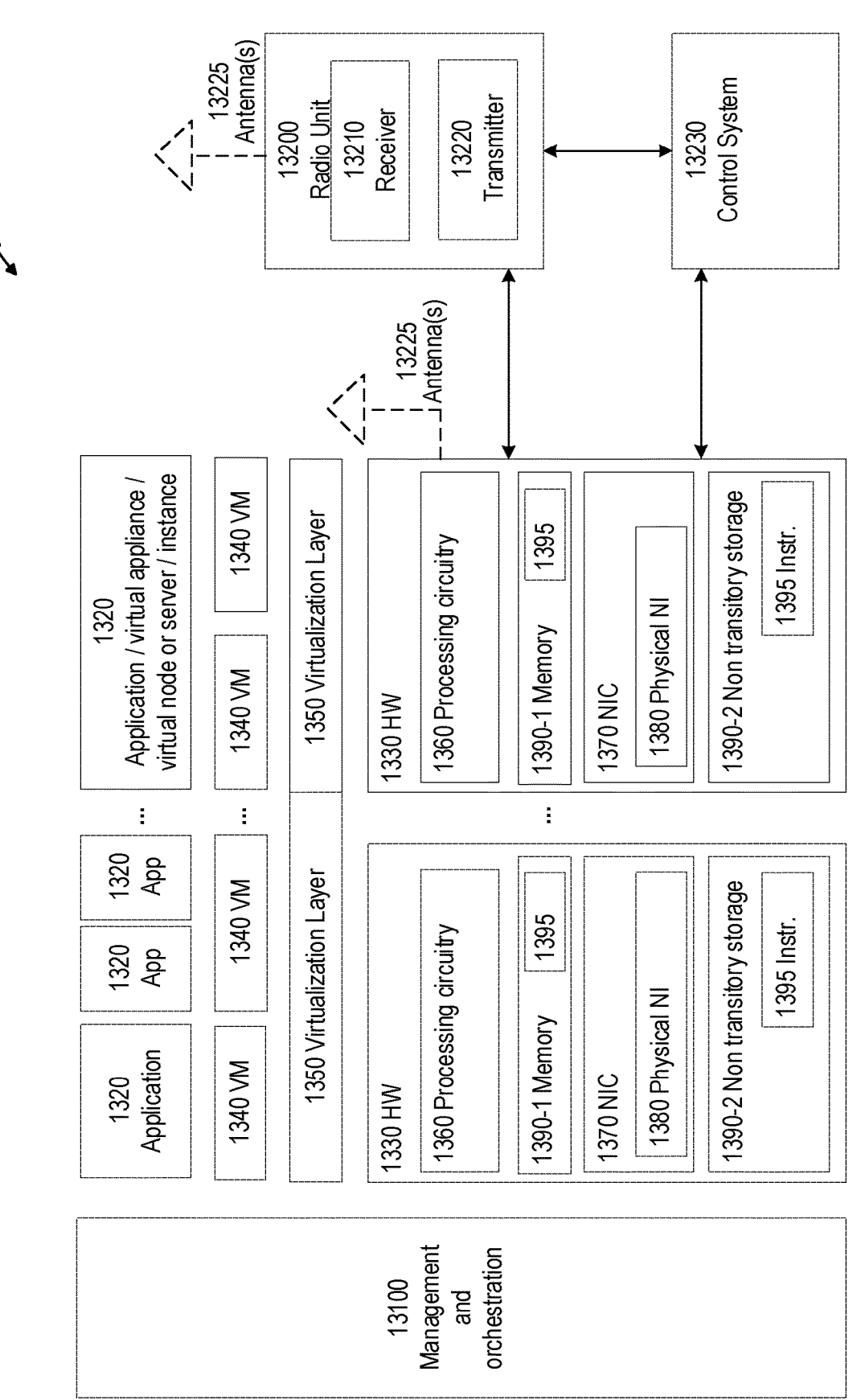
FIG. 13 is a block diagram illustrating a network environment that can facilitate virtualization of various functions implemented according to various exemplary embodiments of the present disclosure.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300 can include general-purpose or special-purpose network hardware devices (or nodes) 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. For example, instructions 1395 can include program instructions (also referred to as a computer program product) that, when executed by processing circuitry 1360, can configure hardware node 1320 to perform operations corresponding to various exemplary methods (e.g., procedures) described herein. Such operations can also be attributed to virtual node(s) 1320 that is/are hosted by hardware node 1330.

Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 13230, which can alternatively be used for communication between the hardware nodes 1330 and radio units 13200.

Figure 14:
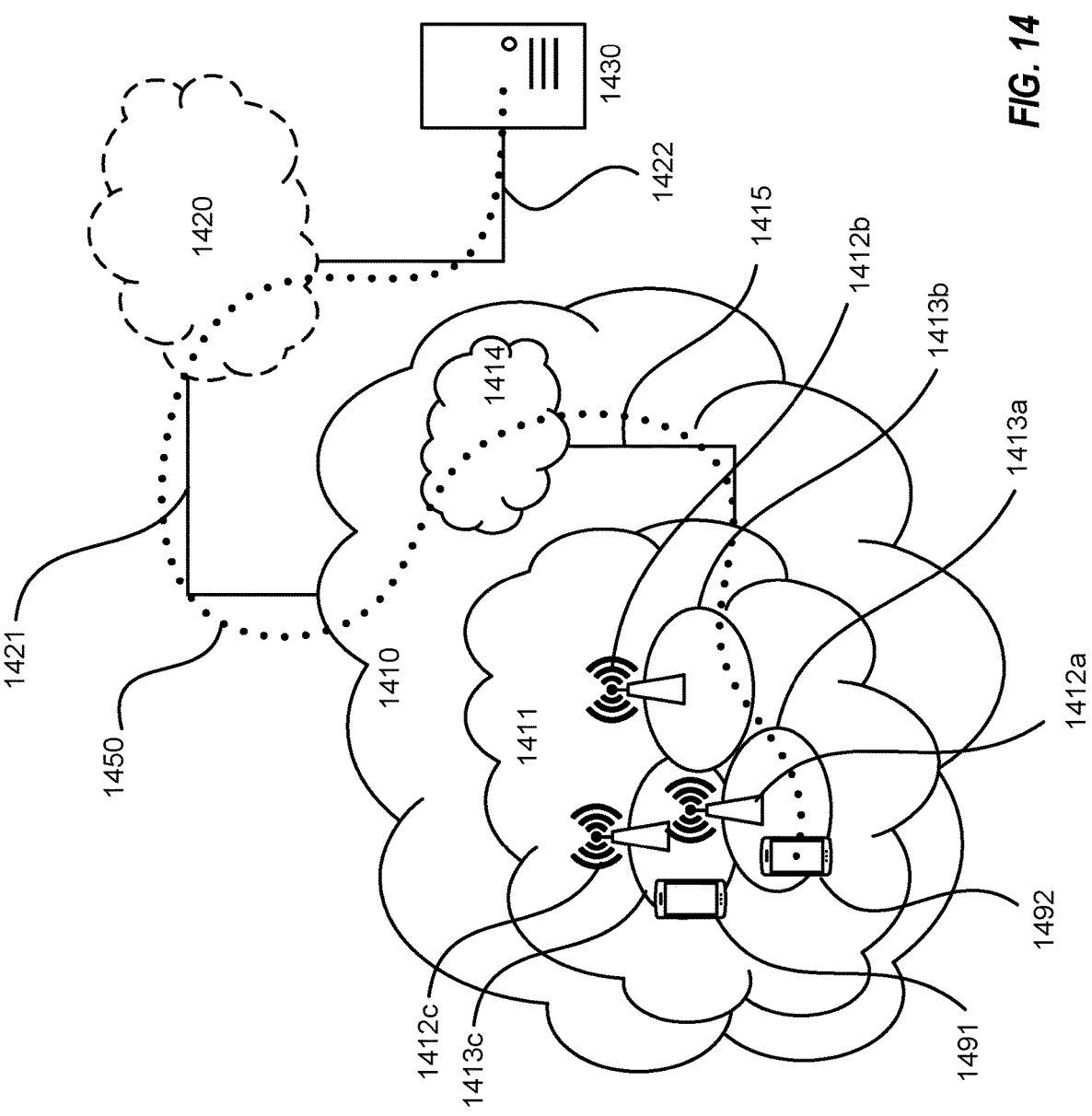
FIGS. 14-15 are block diagrams of exemplary communication systems configurable according to various exemplary embodiments of the present disclosure.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct, or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions.

Base station 1520 also includes software 1521 stored internally or accessible via an external connection. For example, software 1521 can include program instructions (also referred to as a computer program product) that, when executed by processing circuitry 1528, can configure base station 1520 to perform operations corresponding to various exemplary methods (e.g., procedures) described herein.

Communication system 1500 can also include UE 1530 already referred to, whose hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions.

UE 1530 also includes software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides. Software 1531 can also include program instructions (also referred to as a computer program product) that, when executed by processing circuitry 1538, can configure UE 1530 to perform operations corresponding to various exemplary methods (e.g., procedures) described herein.

Figure 15:
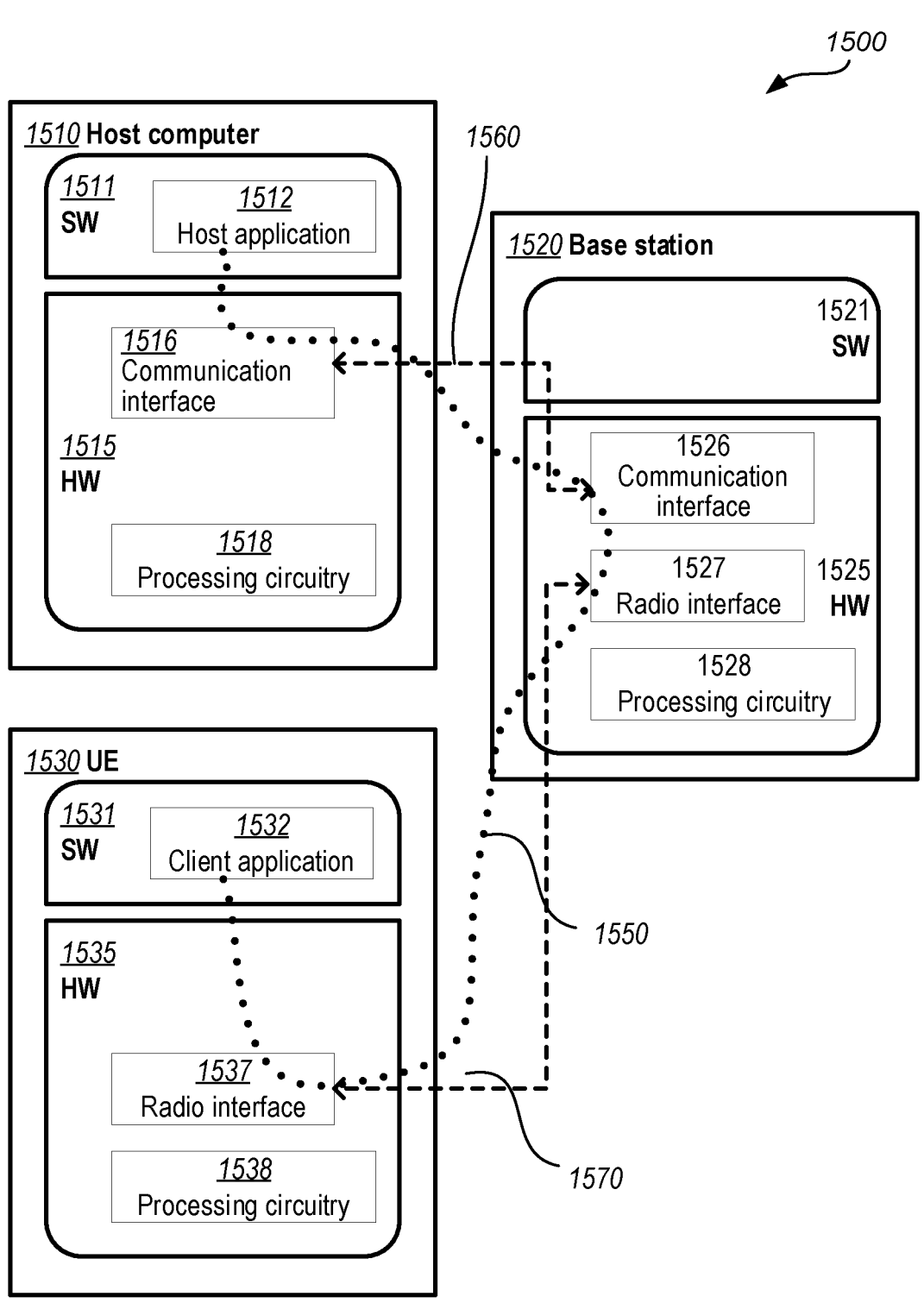

As an example, host computer 1510, base station 1520 and UE 1530 illustrated in FIG. 15 can be similar or identical to host computer 1430, one of base stations 1412a-c, and one of UEs 1491-1492 of FIG. 14, respectively. In other words, the inner workings of these entities can be as shown in FIG. 15 and the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors, etc.

FIG. 16 is a flowchart illustrating an exemplary method (e.g., procedure) implemented in a communication system, in accordance with one embodiment. The communication system includes a host computer, a base station and a UE which, in some exemplary embodiments, can be those described with reference to other figures herein. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

E1. A method, performed by a network node in a wireless network, for allocating resources for device-to-device (D2D) wireless communication between a first user equipment (UE) and a second UE, the method comprising:

transmitting, to the first UE, a configuration that associates each of one or more channels between the first UE and the second UE with a corresponding hybrid ARQ (HARQ) feedback mode; and transmitting, to the first UE, information identifying resources usable for communicating via the one or more channels.

E2. The method of embodiment E1, wherein the information identifying the resources comprises a grant of resources usable by the first UE for transmitting, to the second UE, data associated with at least a portion of the channels and a HARQ feedback mode associated with the granted resources.

E3. The method of embodiment E2, wherein the HARQ feedback mode associated with the granted resources includes one of the following: ACK/NACK feedback is supported;

NACK-only feedback is supported;

either ACK/NACK or NACK-only feedback is supported; or no HARQ feedback is supported.

E4. The method of any of embodiments E2-E3, wherein the grant also includes an indication of whether the granted resources can be used for one or more of the following: initial transmissions and retransmissions.

E5. The method of any of embodiments E2-E4, wherein:

the configuration also includes identification of one or more resource pools and an association of each identified resource pool with a corresponding HARQ feedback mode; and the resource grant includes information identifying a particular one of the resource pools.

E6. The method of any of embodiments E2-E5, further comprising:

receiving, from the first UE, a buffer status report including identifiers of ones of the channels having data buffered for transmission;

determining hybrid ARQ modes associated with the respective channel identifiers; and selecting the resources comprising the resource grant from a resource pool that supports the determined hybrid ARQ modes.

E7. The method of embodiment E1, wherein the information identifying the resources comprises identification of one or more resource pools and an association of each identified resource pool with a corresponding HARQ feedback mode.

E8. The method of embodiment E7, wherein the configuration associates each of the channels with a plurality of resource pools.

E9. The method of any of embodiments E1-E8, further comprising receiving, from the first UE, HARQ feedback related to one of the channels.

E10. A method performed by a first user equipment (UE) configured for wireless communication with a second UE and with a network node in a wireless network, the method comprising:

receiving, from the network node, a configuration that associates each of one or more channels between the first UE and the second UE with a corresponding hybrid ARQ (HARQ) feedback mode; and receiving, from the network node, information identifying resources usable for communicating via the one or more channels.

E11. The method of embodiment E10, further comprising:

selecting one of the plurality of channels based on the selected channel having:

data buffered for transmission, and an associated HARQ feedback mode that is compatible with the HARQ feedback mode associated with the identified resources; and transmitting, to the second UE, the buffered data for the selected channel using at least a portion of the identified resources.

E12. The method of any of embodiments E10-E11, wherein the information identifying the resources also includes a HARQ feedback mode associated with the identified resources, the HARQ feedback mode including one of the following:

ACK/NACK feedback is supported;

NACK-only feedback is supported;

either ACK/NACK or NACK-only feedback is supported; or no HARQ feedback is supported.

E13. The method of any of embodiments E10-E12, wherein the information identifying the resources comprises a grant of resources usable by the first UE for transmitting, to the second UE, data associated with at least a portion of the channels.

E14. The method of embodiment E13, wherein the grant also includes an indication of whether the granted resources can be used for one or more of the following: initial transmissions and retransmissions.

E15. The method of any of embodiments E10-E14, wherein:

the configuration also includes identification of one or more resource pools and an association of each identified resource pool with a corresponding HARQ feedback mode; and the resource grant includes information identifying a particular one of the resource pools.

E16. The method of any of embodiments E11-E12, wherein the information identifying the resources comprises identification of one or more resource pools of assignable resources.

E17. The method of embodiment E16, wherein the configuration associates each of the channels with a plurality of resource pools.

E18. The method of any of embodiments E16-E17, further comprising:

selecting one of the identified resource pools having an associated HARQ feedback mode that is compatible with the HARQ feedback mode associated with the selected channel; and from the selected resource pool, selecting resources for transmitting the data buffered for the selected channel.

E19. The method of any of embodiments E10-E18, further comprising sending, to the network node, a buffer status report including identifiers of ones of the channels having data buffered for transmission, wherein the information identifying the resources is received in response to the buffer status report.

E20. The method of any of embodiments E10-E19, further comprising transmitting, to the network node, HARQ feedback related to one of the channels.

E21. A network node, in a wireless network, configured to allocate resources for device-to-device (D2D) wireless communication between a first user equipment (UE) and a second UE, the network node comprising:

radio interface circuitry configured to communicate with at least the first UE; and processing circuitry operably coupled with the radio interface circuitry, whereby the processing circuitry and the radio interface circuitry are configured to perform operations corresponding to any of the methods of embodiments E1-E9.

E22. A network node, in a wireless network, configured to allocate resources for device-to-device (D2D) wireless communication between a first user equipment (UE) and a second UE, the network node being further arranged to perform operations corresponding to any of the methods of embodiments E1-E9.

E23. A non-transitory, computer-readable medium storing computer-executable instructions that, when executed by processing circuitry comprising a network node in a wireless network, configure the network node to perform operations corresponding to any of the methods of embodiments E1-E9.

E24. A computer program product comprising computer-executable instructions that, when executed by processing circuitry comprising a network node in a wireless network, configure the network node to perform operations corresponding to any of the methods of embodiments E1-E9.

E25. A first user equipment (UE) configured for wireless communication with a second UE and a network node of a wireless network, the first UE comprising:

radio interface circuitry configured to communicate with the second UE and the network node; and processing circuitry operably coupled with the radio interface circuitry, whereby the processing circuitry and the radio interface circuitry are configured to perform operations corresponding to any of the methods of embodiments E10-E20.

E26. A first user equipment (UE) configured for unicast device-to-device (D2D) wireless communication with at least a second UE, the first UE being further arranged to perform operations corresponding to any of the methods of embodiments E10-E20.

E27. A non-transitory, computer-readable medium storing computer-executable instructions that, when executed by processing circuitry comprising a first user equipment (UE), configure the first UE to perform operations corresponding to any of the methods of embodiments E10-E20.

E28. A computer program product comprising computer-executable instructions that, when executed by processing circuitry comprising a first user equipment (UE), configure the first UE to perform operations corresponding to any of the methods of embodiments E10-E20.

The invention claimed is:

1. A method, performed by a network node in a wireless network, for providing resources for device-to-device (D2D) wireless communication between a first user equipment (UE) and a second UE, the method comprising: transmitting, to the first UE, a configuration that associates one or more sidelink (SL) channels between the first UE and the second UE with respective one or more first HARQ feedback modes, wherein each first HARQ feedback mode is one of the following: HARQ enabled, or HARQ disabled; receiving, from the first UE, a buffer status report including identifiers of one or more of the SL channels that have data buffered for transmission; and transmitting, to the first UE in response to the buffer status report, resource information that identifies a second HARQ feedback mode that is compatible with a first HARQ feedback mode associated with the one or more of the SL channels that have data buffered for transmission.

2. The method of claim 1, wherein: the method further comprises selecting resources from a resource pool that is associated with the second HARQ feedback mode; and the resource information identifies the selected resources as granted resources for the first UE to transmit the buffered data to the second UE.

3. The method of claim 2, wherein: the resource information also identifies physical uplink control channel (PUCCH) resources for the first UE; and the method further comprises receiving, from the first UE via the identified PUCCH resources, HARQ feedback related to the granted resources.

4. The method of claim 1, wherein the configuration or the resource information also identifies: a plurality of resource pools from which the first UE can select resources for transmitting data associated with the one or more SL channels; and a plurality of second HARQ feedback modes associated with the respective resource pools.

5. The method of claim 4, wherein when the configuration identifies the plurality of resource pools and the associated plurality of second HARQ feedback modes: the method further comprises selecting a resource pool having an associated second HARQ feedback mode that matches the first HARQ feedback mode associated with the one or more of the SL channels having data buffered for transmission; and the resource information identifies the selected resource pool.

6. The method of claim 4, wherein each second HARQ feedback mode associated with a resource pool is one of the following: HARQ enabled, or HARQ disabled.

7. The method of claim 6, wherein the following applies to each second HARQ feedback mode associated with a resource pool: when the second HARQ feedback mode is HARQ enabled, the associated resource pool includes physical sidelink feedback channel (PSFCH) resources; and when the second HARQ feedback mode is HARQ disabled, the associated resource pool excludes PSFCH resources.

8. The method of claim 1, wherein when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

9. The method of claim 1, wherein the resource information also indicates whether the granted resources can be used for one or more of the following: initial transmissions and retransmissions.

10. A method for device-to-device (D2D) wireless communication by a first user equipment (UE) in a wireless network, the method comprising: receiving, from a network node, a configuration that associates one or more sidelink (SL) channels between the first UE and a second UE with respective one or more first HARQ feedback modes, wherein each first HARQ feedback mode is one of the following: HARQ enabled, or HARQ disabled; transmitting, to the network node, a buffer status report including identifiers of one or more of the SL channels that have data buffered for transmission; receiving, from the network node in response to the buffer status report, resource information that identifies a second HARQ feedback mode; and based on the resource information, transmitting, to the second UE, data buffered for a particular one of the SL channels that has an associated first HARQ feedback mode that is compatible with the second HARQ feedback mode.

11. The method of claim 10, wherein: the resource information includes granted resources for the first UE to transmit the buffered data to the second UE; the second HARQ feedback mode is associated with the granted resources; and the buffered data is transmitted using the granted resources.

12. The method of claim 11, wherein: the resource information also identifies physical uplink control channel (PUCCH) resources for the first UE; and the method further comprises transmitting, to the network node via the identified PUCCH resources, HARQ feedback related to the granted resources.

13. The method of claim 10, wherein the configuration or the resource information also identifies: a plurality of resource pools from which the first UE can select resources for transmitting data associated with the one or more SL channels; and a plurality of second HARQ feedback modes associated with the respective resource pools.

14. The method of claim 13, wherein when the configuration identifies the plurality of resource pools and the associated plurality of second HARQ feedback modes: the resource information identifies a particular one of the resource pools that is associated with the second HARQ feedback mode; and the method further comprises selecting, from the particular resource pool, resources used for transmitting the buffered data.

15. The method of claim 13, wherein each second HARQ feedback mode associated with a resource pool is one of the following: HARQ enabled, or HARQ disabled.

16. The method of claim 15, wherein the following applies to each second HARQ feedback mode associated with a resource pool: when the second HARQ feedback mode is HARQ enabled, the associated resource pool includes physical sidelink feedback channel (PSFCH) resources; and when the second HARQ feedback mode is HARQ disabled, the associated resource pool excludes PSFCH resources.

17. The method of claim 10, wherein when a first HARQ feedback mode is HARQ enabled, the first HARQ feedback mode further indicates one of the following: ACK/NACK feedback is supported; NACK-only feedback is supported; or either ACK/NACK or NACK-only feedback is supported.

18. The method of claim 11, wherein the resource information also indicates whether the granted resources can be used for one or more of the following: initial transmissions and retransmissions.

19. A network node configured to provide resources for device-to-device (D2D) wireless communication between a first user equipment (UE) and a second UE in a wireless network, the network node being further configured to perform operations corresponding to the method of claim 1.

20. A first user equipment (UE) configured for device-to-device (D2D) wireless communication in a wireless network, the first UE comprising: radio interface circuitry configured to communicate with at least a second UE and with a network node of the wireless network; and processing circuitry operably coupled to the radio interface circuitry, whereby the processing circuitry and the radio interface circuitry are configured to perform operations corresponding to the method of claim 10.

* * * * *